United States Patent Office 3,409,416
Patented Nov. 5, 1968

3,409,416
NITRIDE-REFRACTORY METAL COMPOSITIONS
Paul C. Yates, Wilmington, Del., assignor to E. I. du Pont de Nemours and Company, Wilmington, Del., a corporation of Delaware
No Drawing. Continuation-in-part of application Ser. No. 457,467, May 20, 1965, which is a continuation-in-part of applications Ser. No. 371,776 and Ser. No. 371,779, June 1, 1964. This application Aug. 29, 1966, Ser. No. 580,848
15 Claims. (Cl. 29—182.5)

ABSTRACT OF THE DISCLOSURE

Dense refractory compositions containing a nitride of aluminum, titanium, zirconium, tantalum, hafnium, niobium, vanadium or their mixtures interdispersed with a metal binder selected from among molybdenum, tungsten, rhenium and their alloys, and optionally containing substantial amounts of other refractory oxides, nitrides, silicates, aluminates, chromites or carbides such as alumina or titanium carbide, are useful as cutting tool tips.

Cross-reference to related applications

This application is a continuation-in-part of copending application Ser. No. 457,467 filed May 20, 1965, which, now abandoned, in turn is a continuation-in-part of copending applications Ser. Nos. 371,776 and 371,779 filed June 1, 1964, now abandoned.

This invention relates to refractory compositions and is more particularly directed to aluminum nitride, titanium nitride, zirconium nitride, tantalum nitride, hafnium nitride, niobium nitride, vanadium nitride, or a mixture of them interdispersed with molybdenum, tungsten, rhenium, and their alloys with each other and with chromium. The invention is further directed to the preparation of these interdispersions as dense bodies, to their use as high temperature refractories and cutting tools, and to the preparation of the nitrides utilized in the interdispersions.

The refractory interdispersions of this invention are exceptionally hard and strong, and display outstanding resistance to chemicals, thermal shock, impact, and high temperatures. Accordingly, they can be used in the numerous ways in which refractory materials are conventionally used. Further, in the form of tool bits and cutting tools, these interdispersions display great resistance to wear, great resistance to cratering, and are resistant to welding to work pieces being cut even at high speeds.

The term interdispersion as used herein describes a relationship of the constituents and is meant to include traditional dispersions in which there is a dispersed particulate phase and a dispersant continuous phase. It is also meant to include those mixtures in which there are two or more phases and some or all of them are continuous and interpenetrating as well as simple mixtures in which the phases are particulate or interrupted and homogeneously intermixed.

According to the present invention I have discovered that a homogeneous interdispersion of fine particles of aluminum nitride, titanium nitride, zirconium nitride, tantalum nitride, hafnium nitride, niobium nitride, vanadium nitride or their mixtures with molybdenum, tungsten, rhenium, their alloys with each other, or their alloys with chromium, in a manner such that the nitride and the metal are mutually dispersed in relation to one another, provides a refractory interdispersion possessing exceptional properties.

The metals suitable for use in the dispersions of this invention are molybdenum, tungsten, rhenium, and their alloys in any proportion with one another and chromium. Also minor amounts of other conventional alloying agents can be used with these metals as is more fully explained hereinafter.

These metals with the requisite degree of purity can be obtained from commercial sources or they can be prepared in a conventional manner. A suitable method of preparation and purification is fully set forth hereinafter.

The nitrides of this invention are those chemically stable, refractory nitrides of Groups III, IV-B and V-B of the Periodic Table, having free energies of formation greater than 30 kilocalories per gram atom of nitrogen at 298° Kelvin, and melting points, sublimation points or decomposition points in excess of 2000° C.

The nitrides of this invention, sometimes referred to hereinafter as essential nitrides, can be prepared in any conventional manner, by suitable reactions in molten salts as described in applicant's copending application Ser. No. 457,468, filed May 20, 1965, now abandoned, or by nitriding the corresponding finely milled hydride or metallic element. The previously named nitrides can be used alone, in combination with each other, or in mixtures with other stable refractory compounds. Preparation of the nitrides from the corresponding hydrides and metals and suitable refractory additives and the criteria for their selection are described in full hereinafter.

The interdispersions of this invention are prepared by intimately intermixing the nitride to be used, in the form of very fine particles, with the metal to be used, also in the form of very fine particles, until a homogeneous interdispersion is obtained. The homogeneous powder can then be heated and pressed into the desired form and to the desired degree of density. Methods of preparing the powder interdispersions and refractory interdispersions are more fully discussed hereinafter.

The preparation of the powder interdispersions is very important because the outstanding properties of the refractory interdispersions formed therefrom depend to a large degree on the composition of the powder. For example, the homogeneity of the interdispersion of metal and nitride, the ultimate particle and crystal size of the nitride and metal, and the proportional amounts of metal and nitride are critical in achieving the desired properties in the refractory interdispersions of this invention and are largely determined by the powder which is used to form the refractory interdispersion.

The particle size of the metal and nitride being incorporated into the powder interdispersions of this invention should be as small as is practicable and the preferred maximum particle size is about fifty microns. However, as the desired homogeneity of interdispersion is much easier to attain as the particle size decreases, it is advantageous for the components to have an average particle size of less than ten microns.

If the interdispersed powders are to be used to form very strong refractories like cutting tools and bits, it is preferred that the average particle size of the components be smaller than one micron. Such a particle size adds significantly to the degree of strength, toughness and wear resistance obtainable in the refractory interdispersions of this invention and necessary for the use of such compositions as cutting tools.

Refractory interdispersions of this invention can be formed from powdered interdispersions of the nitride and metal wherein there is from about one to about ninety-nine parts by volume of nitride per part of metal. If the amount of nitride in a powder is below one part by volume per part of metal, the hardness of a refractory dispersion made therefrom is less than that which is desired. Amounts of nitride in the powders above ninety-nine parts per part of metal tend to lessen significantly the impact strength of refractories made therefrom.

A preferred amount of nitride in the powder interdispersions of this invention is between 1.5 and 19 parts by volume per part of metal. Restricting the amount of the nitride to less than 19 parts by volume increases the probability of continuity of the metal within the refractory interdispersion to be formed, and in turn, the probability of outstanding impact resistance, strength, and toughness. Conversely, the presence of at least 1.5 parts of nitride by volume per part of metal in the powder insures a hardness, wear resistance. and chemical resistance in a refractory interdispersion made therefrom which makes it very desirable for such refractory uses as cutting tools and bits.

One of the preferred embodiments of this invention is a powder interdispersion in which the nitride particles are separated from each other by particles of the metal. This retards agglomeration or aggregation of the nitride particles during fabrication of refractory interdispersions of the invention.

Another preferred embodiment of this invention is a dispersion in which discrete nitride particles are uniormly dispersed in the metal which is present as a continuous matrix separating the discrete nitride particles. Such a distribution of the metal ordinarily provides greatly improved mechanical properties in a refractory interdispersion, making it very desirable for uses such as cutting tools and bits. The term discrete, as used herein, means individually distinct or composed of distinct parts.

Another preferred embodiment of this invention is a solid interdispersion in which there is a limited degree of interconnection into a continuous matrix, or three-dimensional network, of both of the principal phases of the invention. Such a structure is one in which both the nitride phase and the metal phase are co-continuous with an interpenetrating network of each phase being simultaneously present. Such compositions exhibit most outstanding properties when the individual crystallites of the interpenetrating networks, although connected to one another, remain quite small and distinguishable and thus discrete.

However, it must be noted that a distribution of the nitride and metal such as described in the three preceding paragraphs is not essential to this invention since outstanding refractories can be produced in the absence of such a state of distribution.

It is desirable that both the nitride and the metal used possess a high degree of chemical purity. In particular it is desirable to avoid the presence in either component of oxygen, carbon, nitrogen, boron, silicon, or sulfur either in uncombined form or as compounds having a lower free energy of formation per atom than the corresponding oxides, carbides, nitrides, borides, silicides or sulfides of molybdenum, tungsten, rhenium or their alloys. Other such elements or compounds in a form and in amounts which would react with or dissolve in the metal phase during fabrication of the refractory interdispersion in such a manner so as to cause undesirable brittleness, should likewise be avoided.

It is sometimes difficult to prepare and maintain the very finely divided powders of this invention completely free of such impurities as oxygen and carbon. Therefore it is desirable at such times to add small amounts of metals which will form thermodynamically stable compounds with such impurities as oxygen and carbon. These metals thus act as internal gettering agents.

The metals which are suitable for such use are generally those having very high free energies of formation of their oxides or carbides such as aluminum, thorium, lanthanum, titanium, zirconium and vanadium. They will ordinarily be used in an amount which is slightly in excess of the stoichiometric amount required for reaction with the oxygen, carbon or other impurity.

Somewhat larger amounts of such gettering agents can be used if they form solid solution alloys or refractory, high melting, stable, intermetallic compounds with the bonding metals. The amounts used can therefore range from a few tenths of a percent by weight up to 10 or even 20 percent by weight based on the weight of the metallic phase.

For example, aluminum is particularly desirable gettering agent. It forms a thermodynamically stable refractory oxide, $Al_2O_3$; is capable of simultaneously gettering carbon impurities by forming stable, refractory aluminum oxycarbide $AlOC$; and combines with the bonding metals of this invention to form high melting, refractory, intermetallic compounds and alloys.

Minor amounts of alloying agents conventionally used with the primary metals molybdenum, tungsten, rhenium and their alloys with each other and chromium, can also be used in the dispersions of this invention and are preferably retained as a homogeneous solution with the primary metal, having the crystal structure of the primary metal. Amounts of such alloying agents which would form intermetallic compounds or new crystallographic phases are ordinarily avoided. Allowable percentages of such agents may be determined, according to this criteria, by consulting appropriate phase diagrams in standard metallurgical texts. The solubility of the alloy metals in the primary metals at 600° C., as reflected in such phase diagrams are ordinarily determinative as regards preferred amounts of conventional alloying agents such as aluminum, titanium, zirconium, hafnium, vanadium, niobium, tantalum, manganese, iron, cobalt, and nickel suitable for use with the primary metals of this invention.

It should be noted, however, that even when the alloying agents are present in excess of the above amounts, their presence is not notably detrimental to the refractory interdispersions of this invention so long as the excess is small. Thus, for example, a small dilution of a metal phase such as tungsten with amounts of iron up to 15% in excess of the solubility as determined by the above criteria is not appreciably deleterious to the properties of a refractory interdispersion.

Therefore, the working limit for the minor amounts of alloying agents which can be present in the primary metals of this invention can be defined as not more than 15 volume percent, based on the total amount of metal, in excess of that amount which (a) is held as a homogeneous solid solution at 600° C. in the primary metal, and (b) has the crystal structure characteristic of the primary metal of this invention. Preferably the amount of alloying agent will not exceed that amount characterized in (a) and (b) above.

It will be noted that chromium is a suitable alloying agent for molybdenum, tungsten and rhenium but is not classed with the above alloying agents. This is due to the unusual nature of chromium when it is used in alloys with molybdenum, tungsten and rhenium. Chromium is a member of the same periodic group as molybdenum, and tungsten, and forms solid solution alloys with these metals and rhenium over an unusually extended range without departing from the crystal structure of the molybdenum, tungsten or rhenium. Thus chromium can be alloyed with these metals in almost any proportion without departing from the concept of this invention.

For practical reasons it is ordinarily desirable for the chromium alloys of molybdenum, tungsten and rhenium to contain at least five percent by volume of one of the latter metals, and it is preferred for the chromium alloys to contain at least 10 to 20 volume percent of molybdenum, tungsten or rhenium to insure the absence of any undesirable brittleness. Chromium alloy binders of this invention containing at least 50 volume percent of molybdenum, tungsten or rhenium are most preferred as they exhibit the most desirable combination of properties of the chromium alloys.

As was previously stated, the nitrides of aluminum, titanium, tantalum, hafnium, zirconium, niobium or vanadium can be used singly or in combination with one another or other refractory additives in the interdispersions of this invention. When used in combinations, it will often be noted that varying degrees of interaction occur. This may include the formation of solid solutions, the formation of mixed nitride compounds, or combinations of these. It will be understood that the purposes of this invention are accomplished both when such interactions take place, and in those instances where the several nitrides remain in their original discrete forms. In terms of the properties of the resulting interdispersions such as wear resistance, mechanical properties, and refractory characteristics, simple mixtures, solid solutions, and mixed nitride compounds all behave in a desirable fashion, imparting outstanding characteristics to the compositions of the invention.

Other chemically stable refractory compounds can be used as additives to partially replace the above essential nitrides in the dispersions of this invention. Such refractory chemically stable nitrides as uranium nitride, boron nitride, beryllium nitride, cerium nitride, and thorium nitride can be used to replace a portion of the titanium nitride, tantalum nitride, zirconium nitride, hafnium nitride, vanadium nitride, niobium nitride or aluminum nitride or their mixtures. Chemically stable, refractory carbides, such as titanium carbide, zirconium carbide, tantalum carbide, niobium carbide; chemically stable refractory silicates such as zirconium silicate, magnesium silicate, calcium silicate, barium silicate and strontium silicate; and chemically stable refractory oxides such as magnesia, zirconia, alumina, hafnia, titanium dioxide, chromic oxide, beryllium oxide, zinc oxide, calcium oxide, thoria, barium oxide, strontium oxide, silicia, cerium oxide and rare earth oxides can also be used as partial replacements for the nitrides of this invention. In a similar fashion, some of the more chemically stable and refractory borides, such as the monoborides of titanium or zirconium can also be employed, as can zirconium, magnesium, calcium, barium and strontium aluminates and chromites.

It is essential, however, that a nitride of titanium, tantalum, zirconium, hafnium, vanadium, niobium, aluminum, or their mixtures, always be present in significant amounts as one of the non-metal components in the dispersions of this invention. By significant amounts it is meant that the essential nitrides of the invention must be present in amounts of at least five volume percent of the non-metal phase of the compositions of the invention, and preferably in amounts of at least 50% of the non-metal phase of the interdispersions of this invention. It will generally be noted that the compositions of the invention are improved in proportion to the amount of the essential nitrides which are added, at least up to the point at which a continuous phase of nitride is formed in the solid compositions of the invention. The necessary criterion for assuring that this will be true for the most preferred compositions of the invention will be discussed in greater detail hereinafter.

It is also essential, as previously mentioned, that the refractory compounds used as additives not be those which will react with the bonding metals in such a manner so as to embrittle it, or which will break down to elements whose presence cannot be tolerated for the same reason.

In general, the criteria to be followed in selecting additive compounds is that their melting point should exceed 1400° C., while their free energies of formation from the constituent elements be greater than the free energies of the compounds which would be formed by disproportionation of the additive compound and reaction of the constituent elements with the bonding metal.

For example, $Al_2O_3$ is a satisfactory additive when employed with tungsten-bonded compositions of the invention because its free energy of formation substantially exceeds the combined free energies of the tungsten-aluminum alloy, and the tungstic oxide that would result from its disproportionation and the reaction of its constituents with tungsten. Similarly, titanium carbide is a suitable additive for a molybdenum bonded composition of the invention, since its free energy of formation exceeds the combined free energies of formation of the titanium-molybdenum alloy and of the molybdenum carbide which could result from their disproportionation and reaction with the molybdenum bonding metal.

Any standard reference text which discloses the free energies of formation of metal alloys, intermetallic compounds, and refractory carbides, nitrides and borides can be consulted for the necessary information to apply this criterion.

It should be noted, however, that small amounts of additives, even including those which may react by disproportionation are not absolutely precluded from the compositions of the invention. For example, it would be possible to add a small amount of tungsten carbide to a tungsten bonded composition of the invention, even though a disproportionation reaction between the tungsten bonding metal and tungsten carbide could occur, to form the compound $W_2C$. But when such reactions can occur it is necessary to restrict the amount of any such additive to quantities which are small with respect to the amount of the bonding metals of the invention in the particular composition employed. Such restriction prevents the tying up of an amount of bonding metal which would reduce the strength of the refractory interdispersion and make it undesirably brittle.

The amount of refractory additive to be used will preferably be less than an amount sufficient to form an interpenetrating network of the additive and prevent the formation of a network of the essential nitrides.

Formation of a continuous network does not depend solely on the relative volume fractions of the nitride and the additive, since it is also influenced in considerable degree by the particle size or crystallite size of the nitrides relative to the additive particles. Thus, if coarse-grained particles of the additive are employed, as for example 10 micron sized particles, in conjunction with very finely divided particles of the essential nitrides, for example in the size range of 20 to 100 millimicrons, an interpenetrating network bonded essentially by the essential nitrides will be formed. This is true even though the nitrides are present in amounts as small as 5% of the non-metal phase.

As it is generally preferred to use additives having a particle size of less than a micron, somewhat larger amounts of essential nitrides, on the order of 20% of the non-metal phase, are usually required to achieve desired continuity. Similarly, if the particle size of the essential nitride to be used is larger than 20 millimicrons it can become necessary to use the nitride in the preferred amounts of 50% or more of the non-metal phase to ensure the preferred nitride bonding of the continuous non-metal phase.

A general criterion to follow for the formation of a preferred embodiment of this invention is that the product of the volume fraction and the surface area per unit volume of the essential nitrides be approximately equal to, or preferably in excess of, the product of the volume fraction and surface area per unit volume of the additive to be employed. Proper attention to this criterion in selecting compositions will ordinarily result in the preferred type of structure.

Since the structure is also determined to some extent by the rates of crystal growth which occur during fabrication, however, it is not necessary to apply this criterion in a completely rigid fashion. In particularly favorable circumstances, wherein the rate of growth of the nitride network under the fabrication conditions employed greatly exceeds the rate of growth, or the recrystallization rate of the additive to be employed, amounts of the essential nitrides considerably less than those corresponding to the above criterion can be employed, and the preferred nitride-bonded interpenetrating network of the non-metallic phase still will be formed.

PREPARATION OF THE METALS

As stated previously, the metals which can be used in the interdispersions of this invention are molybdenum, tungsten, rhenium and their alloys with each other and chromium. A suitable method of preparation of these metals for incorporation into the interdispersions of this invention is low temperature hydrogen reduction of the corresponding metal oxide.

In the preparation of molybdenum and tungsten, whose oxides are somewhat volatile at higher temperature, it is best to employ a two-stage reduction. The oxide is first reduced to a lower valent oxide such as tungsten dioxide or molybdenum dioxide at a temperature below the melting point of the oxide such as about 600° C. The reduction is then completed at a more elevated temperature such as about 900° C. which is low enough to avoid excessive sintering of the metal powder.

The reduction will be followed by milling operations in an inert liquid medium and, if necessary, purification as with hydrochloric acid. In this manner the pure metal can be obtained in a powder form, preferably having a specific surface area greater than one square meter per gram, which is a convenient size for subsequent interdispersion with an essential nitride.

To avoid the necessity for purification it is desirable that the grinding media used in the milling operation be constructed of the same metal as that being prepared, thereby avoiding contamination of the metal through attrition of the grinding media.

PREPARATION OF THE NITRIDES

The nitrides to be used in this invention can be prepared by any conventional method, by a suitable reaction in a molten salt such as described in applicant's copending application, Ser. No. 371,778, filed June 1, 1964 now abondoned or by nitriding the corresponding finely milled hydride or metallic element as described below.

For example, a finely milled hydride of titanium, zirconium, tantalum, or hafnium, or finely divided metallic aluminum, vanadium, or niobium, or a mixture of them, is placed in a gas-tight, high-temperature furnace. Air is displaced from the furnace by purging for about half an hour with an atmosphere such as nitrogen or pure ammonia vapor. The furnace temperature is then increased at a rate of about 250° C. per hour, while maintaining an atmosphere such as nitrogen or ammonia in the furnace. Upon reaching a temperature of from about 700 to about 1000° C., the temperature is held for a sufficient period of time to complete a lower temperature formation of the nitride being formed. This prevents excessive sintering of the metals formed by the decomposition of the hydrides or of the metals themselves if they were used as precursors. The temperature is then raised to about 1100° C., and is held there for from 1 to 16 hours while a flow of ammonia or nitrogen is maintained through the furnace. The temperature is then raised again to about 1200° C., under an atmosphere such as ammonia or nitrogen, and is maintained for a period of from 1 to 8 hours.

The furnace is then cooled to room temperature, and the product removed. It has been found that this three-stage heat treatment avoids the problems of excessive sintering, which may occur if the temperature is taken directly to the final temperature of 1200° C., yet still allows the virtual complete conversion of the metal hydride into the corresponding nitride at the lower temperature.

When the reaction is conducted under these conditions, it is found that all of these metal nitrides can be prepared in the form of nitride crystals whose dimensions are in the colloidal size range. Although these are aggregated to some degree into clusters, the extent of aggregation is not severe, and a relatively short milling cycle in an inert solvent such as a hydrocarbon oil or acetone suffices to break apart the aggregates into essentially their ultimate crystals.

Following the milling, it may be desirable to purify the nitride as by acid treatment, to remove impurities picked up during the milling through attrition of the grinding media. If it is desired to achieve a very low oxygen level, the nitride can be reduced in an atmosphere such as cracked ammonia to remove any oxygen picked up during the purification procedure.

To avoid the necessity for the purification it is preferred to use a grinding media such as the balls of the same metal as that with which the nitride is eventually to be interdispersed.

When nitriding aluminum it is desirable to include from 0.1 to 2% by weight, based on the total weight of the charge, of lithium catalyst and from 1 to 10% by weight, based on the total weight of the charge, of a finely divided high melting point material intimately mixed with the aluminum flakes to prevent the aluminum from forming a molten pool when the temperature exceeds its melting point. Suitable materials for such use are molybdenum, tungsten, chromium, aluminum oxide, aluminum nitride, and aluminum salts which will decompose to aluminum oxide, such as aluminum acetate.

In the presence of such high melting point materials, the reaction temperature can be raised to the 1200–1500° C. range to complete the reaction. When the metals molybdenum, tungsten or chromium are used, a temperature above 1400° C. is recommended to decompose any nitrides of these metals which are present and to eliminate any residual impurities such as carbon or oxygen which may be present in the metals. However, as higher temperatures tend to increase the particle size of the aluminum nitride being formed, it is preferred to restrict the temperature to 1400° C. or below and to use high melting point compounds such as aluminum oxide or nitride.

During the preparation of aluminum nitride it is also preferred to maintain a temperature above 900° C. At lower temperatures the reaction requires long periods of time to go to completion, and the aluminum nitride formed is so chemically reactive that it is difficult to prevent its reaction with water vapor in the air. However, aluminum nitride formed at somewhat lower temperatures can be used if contact with atmospheric moisture is avoided during handling.

PREPARATION OF THE POWDER DISPERSIONS

The interdispersions of the metals with the nitrides, and other refractory compounds if desired, in the form of a powder, make up one of the preferred forms of this invention. The aluminum nitride, titanium nitride, zirconium nitride, tantalum nitride, hafnium nitride, vanadium nitride, niobium nitride, or their mixtures, and such other refractory compounds as may be desired, can be interdispersed with the metal powder in any convenient manner such as by mixing in a hydrocarbon solvent in a colloid mill or a ball mill. Preferably the hydrocarbon will be one of sufficiently high boiling point and flash point to avoid a fire hazard. Ballmilling times of from 24 to 500 hours have been found satisfactory. As will be understood, the liquid grinding medium need not be a hydrocarbon solvent so long as it is free from hydroxyl groups, non-hydroscopic, and preferably waterimiscible.

Since the nitride constituent of the invention is difficult to purify, it is desirable to employ grinding media, such as the balls, of the same metal as that with which the nitride is being interdispersed. This insures that foreign materials will not be introduced as a result of the attrition of the grinding media. The mill can be one which is coated with an elastomeric material such as neoprene, which is not softened or attacked by the grinding fluid. Milling conditions, such as the volume loading of the mill and the rate of rotation, should be optimized as hereinafter illustrated in the examples.

After milling the mixture to homogeneity, the grinding fluid can be removed such as by washing with a suitable solvent such as hexane and driyng under vacuum. A chemical analysis can be performed at this stage, and if appreciable quantities of oxygen, carbon, or nitrogen are combined with the metal in any form other than the stable refractory compounds mentioned previously, the powders can be reduced to remove such impurities. This reduction will preferably be performed below 1000° C. with very dry pure hydrogen.

The average size of the particles can readily be determined by examination of the interdispersed powders using a light microscope for larger particles and an electron-microscope for smaller particles. In the preferred powder interdispersions the surface area per cubic centimeter of solids is from about 3 to about 180 square meters. The surface area per cubic centimeter can be determined by dividing the specific surface area by the density of the solids in the dispersion.

PREPARATION OF REFRACTORY DISPERSIONS

The interdispersions of the metals with the nitrides, and such other refractory compounds as may be desired, in the form of a dense solid, make up another preferred form of this invention. A representative method for forming these interdispersions is by heating and pressing the powder interdispersions to nearly theoretical density in a vacuum or in the presence of an inert atmosphere such as nitrogen, helium, hydrogen or argon.

The pressing temperature will depend on the amount of metal employed, its state of subdivision, and the composition and state of subdivision of the nitride. Generally speaking, the temperatures will range between 3/10 and 9/10 of the melting point, expressed in degrees Kelvin, of the metal component and should be at least 1400° C. and not more than 2200° C. The larger the amount of essential nitride being used, and the lower the pressure being employed, the higher should be the fabrication temperature. Heat and pressure can be applied simultaneously or sequentially, but it it preferred to delay application of the pressure until the goal temperature is reached.

The time the compact spends at the highest temperature used and under the full pressure employed will vary according to the temperature of pressing, the composition, and state of dispersion. Generally, the time will vary from a few seconds to 30 minutes or more.

The pressure employed will also vary according to the temperature and method of fabrication used and the composition and state of dispersion, but will generally range from about 500 pounds to over 6000 pounds per square inch.

The applicable combinations of pressing conditions will hereinafter be more completely illustrated in the examples.

An alternate method of interdispersing the components with one another, prior to preparation of a solid interdispersion, is to precipitate the metal to be used on previously prepared fine particles of the nitride to be used. The metal can be precipitated, for example, as a hydrous oxide and the resulting homogeneous mixture can then be reduced in an atmosphere rich in both nitrogen and hydrogen, such as cracked ammonia. This allows the reduction of the oxides which are present without effecting a change in the nitrides being used.

After a refractory interdispersion has been prepared, the particle sizes of the components can be determined by making a metallographic section, etching the section with an appropriate chemical, and examining the surface with a microscope, using an optical microscope or an electron-microscope, as is appropriate. Where an electron-microscope is to be used, a conventional carbon or plastic replica of the surface is made first and the measurements are then made on the replica.

The average particle size of the components of a refractory interdispersion of this invention should be less than 50 microns. In the more preferred embodiments of this invention the average particle size will be less than 10 microns, and in the most preferred embodiments of the invention the average particle size will be less than one micron.

The nature of the interdispersion of the nitride with the metal and the dimensions of the metal in the refractory interdispersions of this invention will be a function of the fabrication conditions and the volume fraction employed as well as the nature of the starting material. Some clumping or aggregation of nitride particles will occur, but as mentioned previously, one of the preferred embodiments of the invention is that in which most of the nitride particles are separated from each other by some of a continuous metal matrix giving a homogeneous and uniform interdispersion of discrete nitride particles.

Also as stated previously, one of the most preferred embodiments of this invention is a refractory interdispersion in which there is a co-continuous network of very finely divided, discrete crystallites of both the metallic phase and the nitride particles, such crystallites having an average particle size of less than one micron.

More specifically, it is desired that the homogeneity of interdispersion be such that the distribution of the nitride and metal in the refractory interdispersion is on a 1000 square micron scale, and more preferably on a 100 micron scale. By this is meant that a metallographic or an electron micrographic scan, as conventionally used in metallurgy to examine the structure of alloys, will show both the nitride and metal present within a square region no greater than 32 microns on edge, and preferably no greater than 10 microns on edge. Moreover, in the preferred embodiment of this invention each square region 10 microns on edge which is examined will exhibit substantially the same structural characteristics as every other such region in the dispersion within conventional statistical distribution limits.

The presence of a continuous phase of the metal in preferred refractory interdispersions of this invention can be most simply determined by measuring the electrical resistivity of the interdispersion. Since the refractory compounds used in this invention have a higher electrical resistance than do molybdenum, tungsten, rhenium, their alloys with each other and their alloys with chromium, if the refractory compounds are distributed so as to interrupt the continuity of the metal, electrical resistivity of the refractory dispersion will be at least 10 to 100-fold higher than if the metal is continuous. Conversely, if an electrical conductor such as molybdenum, tungsten, rhenium, their alloys with each other, or their alloys with chromium, is distributed as a continuous phase throughout a refractory interdispersion of this invention, the eletcrical resistivity of the interdispersion will be inversely proportional to the volume fraction and thickness of the continuous pathway of the metallic constituent. Appreciable continuity of the metal throughout a refractory interdispersion of this invention is indicated by a specific electrical resistivity of less than about one ohm centimeter; in the preferred refractory interdispersions by a specific electrical resistivity of less than 0.05 ohm centimeter; and in the most preferred refractory interdispersions by a specific resistivity of less than 0.1 milliohm centimeter.

It is usually possible by inspection of suitably prepared metallographic specimens of the compositions of the invention to determine and demonstrate which of them contain the preferred interpenetrating nitride network. If the crystallite size is of the order of a micron or larger for the various components in the structure the existence of such a network may be observed directly in an optical microscope, using a magnification of 1000 or 2000-fold. If some or all of the structural units are substantially smaller than a micron, the structure can be examined by electron micrograph replica techniques using conventional procedures.

A similar technique to that used to determine continuity of the metal phase can be used in some instances to determine whether or not the essential nitrides form a continuous network. For example, interdispersions of the invention in which tungsten or molybdenum is used as the binding metal and titanium nitride is used as the principal essential nitride can be tested in such a manner. There may be present other of the essential nitrides such as aluminum nitride, and suitable additives such as alumina. In such compositions the tungsten is preferentially leached out by reacting the composition with bromine-methanol solution which does not attack the nitrides, oxides, and carbides. The electrical conductivity of the resulting partian structure can then be determined. Since alumina is a nonconductor, as is aluminum nitride, the presence of appreciable conductivity in such a composition would be an indication of a continuous network of titanium nitride, which is a semiconductor having appreciable electrical conductivity even at room temperature.

The refractory interdispersions of this invention have a density in excess of 90% of their theoretical density and preferably in excess of 95% of their theoretical density. Those refractory interdispersions which are to be put to such uses as cutting tools most preferably have a density in excess of 98% of their theoretical density and are substantially free from pores when examined by metallographich methods. The theoretical density is calculated by assuming that the specific volumes of the individual components are additive.

The density of the refractory interdispersions of this invention can be determined by any technique for determining the simultaneous weight and volume of the composite. Most simply the weight can be determined with a sensitive analytical balance and the volume can be determined by mercury or water displacement.

It should be understood that the previously discussed aspects of the structure, purity, density, homogeneity, and metal continuity of the refractory interdispersions of this invention are each contributing factors toward achieving improved properties in such interdispersions. However, the most outstanding results are obtained when all of the characteristics are simultaneously present. Such a refractory in the form of a cutting tool or bit constitutes the most preferred embodiment of this invention.

Such a refractory composite is one in which the nitride particles, and particles of other refractory compounds of used, having an average size of less than a micron, are homogeneously interdispersed with a three-dimensional network of molybdenum tungsten, rhenium, their alloys with each other or their alloys with chromium so that the uniformity of distribution is on a scale of less than 100 square microns. The average size of the metal crystals in the composite is less than one micron and continuity of the metal is such that the composite has an electrical resistivity of less than 0.1 milliohm centimeter. The amount present of the essential nitride, and other refractory compounds if used, is from 1 to 19 parts by volume per part of metal, and the density of the composite is in excess of 99% of the theoretical density. The most preferred metals for such a composite are molybdenum and tungsten. Among the preferred mixtures of refractory compounds are titanium nitride and aluminum nitride, titanium nitride and aluminum oxide; ternary mixtures of aluminum nitride, titanium nitride and aluminum oxide; and mixtures of one, two or all three of those with titanium carbide.

The refractory interdispersions of this invention are hard, strong, thermal shock-resistant and corrosion-resistant. They display high electrical and thermal conductivity and demonstrate superior resistance to erosion. These properties make them particularly useful for structural applications, for corrosion and erosion-resistant chemical process equipment, for high temperature electrodes, for dies, thread guides, bearings and seals.

However, as previously stated, the refractory interdispersions of this invention are most particularly useful as tool bits in cutting, grinding, shaping, drilling, and punching very hard metal or alloys at high speeds. This is due to their great impact strength and thermal conductivity and their unusual resistance to thermal shock, wear, cratering and welding.

In order that the invention may be better understood, the following illustrative examples are given.

Example 1

Ninety-four grams of ballmilled 250 millimicron size particles of titanium hydride are loaded in alumina boats and placed in an alumina tube furnace. The air is displaced from the furnace by purging for 30 minutes with pure nitrogen, after which the atmosphere in the furnace is replaced with ammonuia, which is maintained throughout the subsequent treatment. The temperature of the furnace is increased at the rate of 250° an hour, to a temperature of 1000° C. and the furnace is held at this temperature for 3 hours. The temperature is then raised to 1100° C. and is maintained for 16 hours, following which it is raised to 1200° C. and this temperature is held for 6½ hours. The furnace is cooled to room temperature, and a total of 114 g. of product are recovered in the form of a finely divided powder. This represents 97.8% of the theoretical yield expected from a reaction to form titanium nitride. Chemical analysis shows the product to contain 17.91% nitrogen, 0.47% oxygen, with the balance of the composition being titanium. The nitrogen surface area of this powder is 0.3 m.$^2$/g. and examination by X-ray line broadening shows it to consist of titanium nitride of an average crystallite size of 84 millimicrons. No other phases are present.

50.8 grams of this material are loaded into a 1.1 liter rubber-lined steel ball mill with 9.45 g. of finely divided tungsten metal having a particle size of about 100 millimicrons, and 2500 g. of tungsten carbide-6% cobalt inserts. The tungsten carbide-cobalt inserts are about ¼" in diameter and ¼" long in the form of small cylinders. Also loaded into the mill is 350 cc. of a high boiling hydrocarbon oil having a flash point of 185° F. This mill is rotated on rubber-lined rollers for a period of 24 hours at a speed of 60 r.p.m.

The resulting finely divided powder of interdispersed titanium nitride and tungsten metal is recovered from the mill and separated from the tungsten carbide-cobalt rod inserts, removed from the majority of the oil by decantation, and washed completely free of oil by six washes with hexane. It is then dried in a vacuum oven. Chemical analysis shows the powder to consist of about 18.7 parts by volume titanium nitride, and about 0.3 part by volume tungsten carbide per part by volume of a metal which is 98 volume percent tungsten and 2 volume percent cobalt. The tungsten carbide and cobalt are picked up by attrition of the rod inserts during the grinding process.

Twenty-five grams of this powder is placed in a cylindrical carbon mold which is inserted into a hot press, the temperature of the furnace is raised to 1000° C., and a pressure of 4000 p.s.i. imposed. The temperature of the furnace is then increased, while maintaining this pressure, to a final temperature of 2000° C. and held for a period of 5 minutes. The sample is then removed from the furnace. The resulting refractory interdispersion of the invention is cut with a diamond saw into specimens for testing transverse rupture strength, impact strength, hardness on the Rockwell A scale, and density. A section is also machined into the form of a metal cutting tool insert. The transverse rupture strength is 57,000 p.s.i., its impact strength 6.4 ft.lbs./in.$^2$, and its Rockwell A hardness 90.5. The density is 6.11 g./cc., which is 97.8% of the 6.25 g./cc. density to be expected for this composition.

This refractory is an excellent cutting tool on 4340 steel even at a speed of 1500 surface feet per minute.

Example 2

Forty and two-tenths grams of the titanium nitride powder of Example 1 and 47.7 grams of a 100 millimicron tungsten metal powder are placed in a ball mill, along with the same amount of tungsten carbide-cobalt inserts and hydrocarbon oil as described in Example 1. Milling is carried out in a similar fashion as is the recovery of the final product. The resulting powder is shown by chemical analysis to contain about 3.0 parts by volume titanium nitride and about 0.05 part by volume tungsten carbide per part by volume of a metal which is 99.6 volume percen tungsten and 0.4 volume percent cobalt.

Thirty-two grams of this powder is placed in a carbon cylinder and pressed in the equipment of Example 1, also using the same pressing conditions. The resulting refractory interdispersion of the invention has a transverse rupture strength of 83,000 p.s.i., an impact strength of 9.9 ft.lbs./in.$^2$, and a Rockwell A hardness of 88.3. Its density is 8.79 g./cc., which is 98% of the theoretical density of 8.97 g./cc. to be expected for this composition.

Metallographic examination of the refractory shows an interdispersion of titanium nitride and tungsten carbide with a tungsten-cobalt alloy. The average particle size of the alloy crystals ranges from .4 to .8 micron and the average particle size of the titanium nitride is about .5 micron.

The metallographic examination of the interdispersion also shows that both the tungsten-cobalt alloy and the titanium nitride are present within a square region 10 microns on edge, and of ten such 100 square micron regions examined, nine exhibit these same structural characteristics.

The electrical resistivity of the dispersion is about 0.01 milliohm centimeter. This low value of electrical resistivity indicates that the continuity of the metal in this refractory interdispersion is not interrupted by titanium nitride.

A cutting tool insert of this composition is tested on 4340 steel, using a depth of cut of 1/16" and varying the surface speed at which cutting is performed. At a speed of 500 surface feet per minute, after 3 minutes of cutting, the flank wear is 6 mils, the depth of the crater formed is ¼ of 1 mil, and the crater width is 22 mils. At a surface speed of 1000 feet per minute, after testing for 1 minute, the flank wear is 5 mils, the depth of crater is ½ of 1 mil, and the crater width is 26 mils. Even at a surface speed of 1500 feet per minute, the flank wear after 1 minute of cutting ranges between 6 and 15 mils for several different faces of this tool insert, while the crater width is 16 mils, and the depth of the crater is 2 mils.

Example 3

Ninety-three and two-tenths grams of ball-milled zirconium hydride are placed in alumina boats and placed in a cold alumina tube. The tube is swept out with ammonia plus nitrogen. While maintaining a flow of ammonia, the tube is heated to 1000° C. over a period of 3 hours. It is held at 1000° C. for three hours and the temperature is then raised to 1100° C. and held there for 16 hours. Finally, it is heated to 1200° C. and held for a period of 8 hours, cooled to 250° C., removed from the hot zone of the furnace under nitrogen, and cooled to room temperature.

Chemical analysis shows this material to be composed of 11.28% nitrogen, 0.27% oxygen, and 88.2% zirconium.

X-ray examination shows it to be zirconium nitride, having a crystallite size of 160 millimicrons, as shown by line broadening.

Sixty-seven and four-tenths grams of the zirconium nitride powder and 9.6 grams of a finely divided tungsten metal powder are milled for 24 hours in a 1.1 liter rubber-lined steel ballmill, filled to 40% of its volume with ¼" diameter, ¼" long cylindrical rods of tungsten carbide-6% cobalt. The mill also contains 350 cc. of the high boiling hydrocarbon oil of Example 1. The milling speed is 60 r.p.m. The recovery of the mixed powders of tungsten metal and zirconium nitride is as described in previous examples. This powder is hot pressed under the conditions described in Example 1 and the resulting refractory interdispersion of the invention recovered. It contains about 19 parts by volume of zirconium nitride per part by volume of tungsten and has a density of 7.37 g./cc., which is 96% of the theoretical density to be expected for this composition. Its hardness on the Rockwell A scale is 87.8, its impact strength is 2.9 ft.lbs./in.$^2$, and its transverse rupture strength is 52,100 p.s.i.

This refractory is machined into a cutting tool insert and employed as a cutting tool on 4340 grade steel. Using a depth of cut of 1/16" and varying the cutting speed, it is observed that at a cutting speed of 500 surface feet per minute, using a cutting time of 3 minutes, the flank wear is 6.5 mils, the crater width is 20 mils, and the crater depth is 0.8 mil. At a cutting speed of 1000 surface feet per minute after 1 minute of cutting, the flank wear is 5 mils, the crater width 20 mils, and the crater depth ½ mil. Even at 1500 surface feet per minute, after one minute, the flank wear is still only 35 mils, the crater width 30 mils, and the crater depth 3.5 mils.

Example 4

Fifty-two and two-tenths grams of the zirconium nitride of Example 3 and 48.3 g. of finely divided tungsten metal powder are milled, using the equipment and conditions described in Example 3.

Forty grams of this powder is pressed, using the conditions described in Example 1 and the resulting refractory interdispersion of the invention is found to consist of 3 parts by volume of zirconium nitride per part by volume of tungsten. The rupture strength of this refractory is 76,500 p.s.i., its impact strength is 6.6 ft. lbs./in.$^2$., and its Rockwell A hardness is 85.9. Its density is 9.73 g./cc., which is 96% of the theoretical density of 10.15 g./cc. to be expected for this composition.

This refractory is tested as a cutting tool insert on 4340 steel under the conditions described in the previous example. At a cutting speed of 500 surface feet per minute, it is found that the flank wear is 8 mils, the crater width 22 mils, and the crater depth 1 mil after 3 minutes of cutting. At 1000 surface feet per minute, the flank wear is found to be 8 mils, the crater width 21 mils, and the crater depth 1 mil.

Example 5

One and one-half pounds of tungsten metal powder are placed in a 1 gallon steel ballmill filled with 5/16" steel balls to 40% of its volume. This is covered with 1700 cc. of a high boiling hydrocarbon having a flash point of 170° C., and milled for a period of 3 days at a speed of 60 r.p.m. The tungsten metal powder is separated by sedimentation and centrifugation from the oil, and washed two times with hexane, then with acetone, and finally with water. It is treated with a mixture of 1 liter of concentrated hydrochloric acid and 1.5 liters of distilled water, and heated for one hour at 90° C. This is done to dissolve iron picked up during the milling operation. It is allowed to remain stirring with the hydrochloric acid-water mixture overnight. It is then centrifuged to recover the tungsten and to separate this from the dissolved iron which has been removed by acid treatment, and is washed with a 0.1 normal HCl solution until free of iron. This requires five washes. It is then further washed with distilled water until free of chloride ion, and dried in a vacuum oven. The tungsten powder so obtained has a nitrogen surface area of 3.0 m.$^2$/g., corresponding to an individual particle size of about 100 millimicrons. Chemical analysis shows it to consist of 98.91% tungsten metal, 0.6% iron, and 0.66% oxygen.

Seventy-seven and two-tenths grams of the finely divided tungsten are mixed with 32.6 grams of the titanium nitride of Example 1, and the mixture is milled for a period of 3 days in a 1.1 liter rubber-lined ballmill filled to 40% of its volume with ¼" alumina balls, and containing 350 cc. of a high boiling hydrocarbon oil. The recovery of the tungsten-titanium nitride powder dispersion from the mill and its separation from the hydrocarbon oil is as described in Example 1.

Forty-four grams of this interdispersion are pressed at a temperature of 2200° C., using a holding time of 1 minute and a pressure of 4000 p.s.i. The resulting refractory interdispersion of the invention contains 1.5 parts by volume of titanium nitride per part by volume of tungsten and has a transverse rupture strength of 106,000 p.s.i., an impact strength of 11.4 ft.lbs./in.$^2$, and a Rockwell A hardness of 87.5. Its density is 10.93 g./cc., which is 99.6% of the theoretical density to be expected for this composition.

This refractory interdispersion is an excellent cutting tool on steel, even at speeds up to 1000 surface feet per minute, and is also a good cutting tool on cast iron, due to its high impact strength, low wear, and low cratering tendencies.

Example 6

Seventy-seven and two-tenths grams of the tungsten metal prepared as described in Example 5 is loaded into a mill with 36 g. of the zirconium nitride prepared as described in Example 3. Milling and recovery of the milled powders from the oil is performed as described in the previous example. Forty-five grams of the resulting intimately interdispersed tungsten-zirconium nitride powder is pressed at a temperature of 2100° C., with a holding time of 3 minutes using a pressure of 6000 p.s.i. The resulting refractory interdispersion has a rupture strength of 100,000 p.s.i., an impact strength of 9.3 ft.lbs./in.$^2$, a Rockwell A hardness of 86.5, and a density of 10.79 g./cc. This represents 95.3% of the theoretical density for this composition. This refractory interdispersion consists of 1.5 parts by volume of zirconium nitride per part by volume of tungsten metal. This refractory is an excellent cutting tool at rates of cut up to 500 surface feet per minute on cast iron, where its high impact strength and high thermal conductivity makes it useful even in interrupted cuts.

Example 7

One thousand three hundred and sixty grams of −325 mesh molybdenum metal powder is placed in a 1 gallon steel ballmill filled to 40% of its volume with steel balls and also containing 1800 cc. of Phillips Petroleum Co.'s "Soltrol 170" a complex mixture of saturated branch-chain hydrocarbons having a flash point of 85° C. and a boiling range of 215–246° C. This is milled at a speed of 60 r.p.m. for 3 days, after which the molybdenum powder is separated from the hydrocarbon oil and the steel balls, washed thoroughly with hexane to remove the oil, and dried in a vacuum oven. It is purified with a hydrochloric acid-water treatment in a manner identical to that described for the purification of the tungsten metal powder of Example 5. The resulting, finely divided, molybdenum metal powder has an average particle size of from 100 to 200 millimicrons, and contains only traces of iron as an impurity.

Forty-two and two-tenths grams of the titanium nitride of Example 1 are placed in a mill with 7.15 grams of the molybdenum metal powder prepared above. The mill has a 1.1 liter capacity, is of rubber-lined steel, contains 350 cc. of high boiling hydrocarbon oil, and is filled with 2600 g. of tungsten carbide-6% cobalt rod inserts. The mill is operated for 24 hours at 60 r.p.m., following which recovery of the intimately mixed metal powder and titanium nitride is effected as described in previous examples.

Twenty grams of the resulting interdispersion, which consists of 13.3 parts by volume of titanium nitride per part by volume of molybdenum, is hot pressed at a maximum temperature of 2100° C. under a pressure of 6000 p.s.i. and held under these conditions for 15 minutes prior to cooling and removing from the press. The resulting refractory interdispersion of the invention has a transverse rupture strength of 67,000 p.s.i., a Rockwell A hardness of 89.30, and an impact strength of 7.8 ft.lbs./in.$^2$. Its density is 4.88 g./cc., which is 99% of the theoretical density calculated for this composition.

Example 8

Forty-two and fifty-four hundredths grams of the zirconium nitride of Example 3 and 40.8 g. of the finely divided molybdenum metal of Example 7, along with 0.2 g. of titanium hydride are milled under the conditions described in Example 7. Twenty-four grams of the resulting powder are hot pressed at a maximum temperature of 2000° C., using a pressure of 4000 p.s.i. with a holding time of 5 minutes under these conditions.

The resulting refractory interdispersion consists of 1.5 parts by volume of zirconium nitride per part by volume of an alloy of molybdenum containing 0.5% by weight titanium. The transverse rupture strength of this refractory is 85,000 p.s.i., its impact strength is 15 ft.lbs./in.$^2$, and its Rockwell A hardness is 83.0. Its density is 6.33 g/cc., which is substantially the theoretical density to be expected of this composition.

Example 9

Thirty and seven-tenths grams of the titanium nitride of Example 1 is loaded into a mill with 25.5 grams of the colloidal metal powder prepared as described in Example 7. Also added is 0.55 g. of zirconium hydride. Milling is performed in a 1.1 liter rubber-lined steel ballmill filled to 40 percent of its volume with rods of pure molybdenum metal measuring ¼" in diameter and ¼" in length. Milling is continued for a period of 48 hours at 60 r.p.m.

Powder recovery and purification from the hydrocarbon oil is performed as in previous examples.

Forty grams of this powder interdispersion are pressed at a temperature of 2200° C. using a pressure of 4000 p.s.i. with a holding time under these conditions of 1 minute. The resulting dense body of the invention is cooled and cut into specimens for testing its mechanical properties. Chemical analysis shows that it consists of 3 parts by volume of titanium nitride per part by volume of a metal alloy consisting of 98 weight percent molybdenum and 2 weight percent zirconium.

The transverse rupture strength of this refractory is 124,000 p.s.i., its impact strength is 12 ft.lbs./in.$^2$, and its Rockwell A hardness is 84. Its density is 6.62 g./cc., representing 100% of the theoretical density calculated for this composition.

Example 10

An alloy of titanium and tantalum in the weight ratios of 90 parts of titanium for 10 parts of tantalum is hydrided at temperature of 800° C. under an atmosphere of pure hydrogen and cooled slowly in the furnace while maintaining the hydrogen atmosphere. This composition is then ballmilled to furnish a finely divided mixed hydride containing titanium and tantalum in a 90/10 weight ratio. This composition is then nitrided, using the procedures and conditions described in Example 1, to produce a finely divided powder of titanium and tantalum nitrides in the weight ratio of 90 to 10.

Forty-seven and five-tenths grams of this powder, 26.0 g. of the tungsten powder of Example 5, and 1.07 g. of a −10 micron particle size, pure chromium metal powder are loaded into a rubber-lined steel ballmill of 1.1 liter capacity, along with 350 cc. of a high boiling hydrocarbon oil. The mill is also filled to 40% of its volume with ¼″ diameter, ¼″ rods of pure tungsten metal. This composition is milled for 48 hours and is recovered as described in previous examples. Thirty-three grams of the powder interdispersion are pressed at a temperature of 1975° C. using a pressure of 6000 p.s.i., with a holding time of 30 minutes.

The resulting refractory interdispersion consists of about 5.1 parts by volume titanium nitride and about 0.6 part by volume tantalum nitride per part by volume of a tungsten-chromium alloy in a 90 to 10 volume ratio.

The rupture strength of this refractory is 82,000 p.s.i., its impact strength is 8 ft.lbs./in.$^2$, and its density is 7.46 g./cc., representing substantially 100% of the theoretical density for this composition.

Example 11

One hundred and ninety-three grams of the tungsten metal powder of Example 5 and 153 grams of the molybdenum metal powder of Example 7 are intimately mixed and are melted to produce an alloy consisting of 40 volume percent tungsten and 60 volume percent molybdenum. This is crushed in a jaw crusher to reduce it to a powder, and is then milled and purified as described in Examples 5 and 7 for the preparation of a fine tungsten and molybdenum powder, respectively.

Thirty-six and five-tenths grams of the titanium nitride of Example 1 are mixed with 3.2 g. of rutile titanium dioxide having a particle size of about 1 micron, and 33.4 g. of the finely divided molybdenum-tungsten alloy powder. This is milled as described in the previous example, using tungsten rods as the grinding media.

Recovery of the intimately mixed powder is also effected as described in previous examples.

Thirty-five grams of this powder interdispersion are pressed at a temperature of 2000° C. under a pressure of 4000 p.s.i., using a holding time of 15 minutes.

The resulting refractory interdispersion of the invention contains 2.7 parts by volume of titanium nitride and 0.3 part by volume of titanium dioxide per part by volume of a metal alloy of tungsten and molybdenum in a 40 to 60 volume ratio. The transverse rupture strength of this refractory is 100,000 p.s.i., its impact strength is 13 ft.lbs./in.$^2$, and its Rockwell A hardness is 87.3. Its density is 8.40 g./cc. which represents 99.7% of the theoretical density to be expected of this composition.

Example 12

Twenty and two tenths grams of the tungsten metal powder of Example 5, 8.5 g. of 10 micron size rhenium metal powder, 41.6 g. of the titanium nitride powder of Example 1, and 6.0 g. of the zirconium nitride powder of Example 3 are milled, using tungsten rod inserts with the other conditions for milling and for recovery of the powder dispersion being as in the previous example.

Following recovery of the powder and its purification, 35 g. are hot pressed at a temperature of 2100° C., a pressure of 6000 p.s.i., and with a holding time of 1 minute. The resulting refractory interdispersion consists of 5.1 parts by volume of titanium nitride and 0.57 part by volume of zirconium nitride per part by volume of a metal consisting of tungsten and rhenium in the volume ratio of 70 parts of tungsten to 30 parts of rhenium.

This composition is then sintered at a temperature of 2100° C., for a period of 24 hours to complete the alloying of the tungsten and rhenium phases.

Following this treatment, its mechanical properties and density are determined, and found to be 107,000 p.s.i. for the transverse rupture strength, an impact strength of 30 ft.lbs./in.$^2$, and a Rockwell A hardness of 90.0. The density is 6.33 g./cc., which represents 97% of the theoretical density to be expected for this composition.

Example 13

Thirty-eight grams of the titanium nitride of Example 1, 18.4 grams of the molybdenum metal powder of Example 7, and 25.2 g. of 10 micron sized rhenium metal powder are milled using molybdenum rod inserts under the conditions described for the two previous examples. Recovery is also effected as in previous examples.

Thirty-two grams of the resulting finely divided powder interdispersion are pressed at a temperature of 2000° C., under a pressure of 4000 p.s.i., with a holding time of 5 minutes. The product is then annealed in vacuum at 2000° C. for a period of 24 hours to complete the diffusion alloying of the molybdenum and rhenium. The resulting refractory interdispersion contains about 2.33 parts by volume of titanium nitride per part by volume of 60 volume percent molybdenum-40 volume percent rhenium alloy. Its transverse rupture strength is 90,000 p.s.i., its impact strength is 25 ft.lbs./in.$^2$, and its Rockwell A hardness is 89.0. Its density is 8.16 g./cc., which is approximately the theoretical density to be expected for this composition.

Example 14

Thirty and four tenths grams of the titanium nitride of Example 1, 58.6 grams of the tungsten metal powder of Example 5, and 7.8 grams of a −10 micron sized aluminum nitride powder are milled using tungsten rod inserts, 350 cc. of a high boiling hydrocarbon oil as a dispersion medium, a milling time of 48 hours, and a speed of 60 r.p.m. Recovery is effected as previously described, and 36 grams of this composition are pressed at a temperature of 2200° C., under a pressure of 4000 p.s.i., with a holding time of 10 minutes. The resulting refractory interdispersion contains 2.8 parts by volume of titanium nitride and 1.2 parts by volume of aluminum nitride per part by volume of tungsten metal.

The transverse rupture strength of this refractory is 96,000 p.s.i., its impact strength is 7.5 ft.lbs./in.$^2$, its hardness is 90.5 on the Rockwell A scale, and its density is 9.68 g./cc., which is 100% of the theoretical density to be expected of this composition.

Example 15

Four hundred and seven and two tenths grams of the titanium nitride of Example 1 and 19.2 g. of a 100 millimicron particle size tungsten metal powder are milled for 500 hours in a 2 gallon steel ballmill filled to 40% of its volume with tungsten metal rods and containing sufficient high boiling hydrocarbon oil to just cover the tungsten metal rods and the finely divided mixed powders.

Recovery is effected as described in previous examples and the resultant mixture of titanium nitride and tungsten metal is hot pressed at a temperature of 2100° C. under a pressure of 4000 p.s.i., held at this pressure for 5 minutes, cooled, and removed from the press. This refractory consists of an interdispersion of 75 parts by volume of titanium nitride with 1 part by volume of tungsten metal. The density of the composition is 5.69 g./cc. This refractory is an excellent cutting tool, particularly for making high speed cuts at relatively light feeds on steel and cast iron.

Example 16

Five hundred and thirty-seven and six tenths grams of the titanium nitride of Example 1 and 10.2 g. of the molybdenum metal powder of Example 7 are milled as described in the previous example. Recovery from the mill, purification, drying and hot pressing are also as described in the previous example.

The resulting refractory consists of an interdispersion of 99 parts by volume of titanium nitride with 1 part by volume of molybdenum metal. The density of the composition is 5.48 g./cc., which is the theoretical density to be expected of it. As in the previous example, this refractory is an excellent cutting tool for high speed light cuts on steels and cast iron.

Example 17

Forty grams of a finely divided form of gamma alumina, having a surface area of about 200 m.$^2$/g., and consisting of relatively non-aggregated spheres, are mixed with 400 grams of an aluminum flake pigment having an oxygen content of 1.43%. To this mixture is added 5.5 grams of a dispersion of lithium metal in paraffin wax, the content of lithium metal being approximately 37%. These are loaded into a one gallon steel mill which is filled to 40% by volume with steel balls. Then an isoparaffinic hydrocarbon solvent having a flash point of 185° F. is added to the mill in an amount sufficient to cover the steel balls. The loading of steel balls is 9288 grams and 1700 cc. of the high boiling hydrocarbon oil are used. The mill is closed and rotated on rollers running at a speed of 60 r.p.m. for a period of four days. A sample of about 150 grams of this material is separated from the steel balls and the hydrocarbon solvent and loaded into a carbon boat and placed in an alumina tube, which, in turn, is placed in an electric furnace. The temperature is raised to 1450° C. while maintaining an atmosphere of cracked ammonia and N$_2$ in the tube over a period of about 3 hours, and held at that temperature for 2 hours.

The product at this stage consists of a very finely divided aluminum nitride powder having a surface area of 6.6 m.$^2$/g. and a crystallite size by X-ray line broadening of 210 m$\mu$.

After determination of the surface area, this material is placed back into the carbon boat and fired for an additional 8 hours under a nitrogen atmosphere at 1450° C. A chemical analysis shows it to contain 65% aluminum, 2.43% oxygen, and 30.72% nitrogen. Its surface area is 2.0 m.$^2$/g. X-ray line broadening measurements show this material to consists of aluminum nitride having a crystallite size of approximately 265 millimicrons.

Twenty grams of this aluminum nitride is mixed in a high speed mixer, suspended in 200 cc. of the same high boiling hydrocarbon solvent as is used in the milling operation, with 3 grams of −325 mesh molybdenum metal powder. The mixture of aluminum nitride and molybdenum metal is separated from the solvent by sedimentation, washed four times with hexane, and dried overnight in a vacuum oven.

Ten grams of this powder, which consists of about 20.9 parts by volume aluminum nitride per part by volume molybdenum, is pressed in a hot press using 1″ diameter carbon molds. At a temperature of 1600° C. a pressure of 200 p.s.i. is applied to the sample, then the temperature is increased to 1900° C., whereupon the pressure is increased to 4000 p.s.i., the temperature is again increased to 2000° C., and the sample is held at this temperature for 5 minutes. The mold is then cooled and the sample removed.

Metallographic examination of the product shows an interdispersion of molybdenum metal ranging in particle size from 1 to 5 microns, with a four micron average particle size aluminum nitride phase. The molybdenum metal is put in the form of approximately 40 micron size crystals originally, and the milling operation is not extensive. The electrical resistivity of the dispersion is 3.07×10$^5$ ohms.cm. This very high value of electrical resistivity shows that the continuity of molybdenum in this dispersion is interrupted by aluminum nitride. In spite of this, it is to be noted that the performance of this interdispersion as a cutting tool on steel is quite outstanding.

The molded product is cut into small transverse rupture samples, bars for testing the impact strength, and a section for evaluation of cutting tips for cutting steel. The density of the interdispersion is determined to be 3.53 g./cc., representing 98.7% of the theoretical density. Its impact strength is 5.1 ft.lbs./in.$^2$, its hardness 89.2 on the Rockwell A scale, and the average transverse rupture strength of two bars tested is 48,150 p.s.i.

The interdispersion is tested as a cutting tool for steel on 4340 grade steel at feed rates of 340, 500, 1000, and 1500 surface feet per minute. The depth of cut is $\frac{1}{16}$″. The interdispersion performs very satisfactorily, showing a flank wear at 340 surface feet per minute of only 5 mils after 3 minutes of cutting, 9 mils at 500 surface feet per minute after 3 minutes of cutting, and a flank wear of 8 mils after one minute of cutting at 1000 surface feet per minute.

Example 18

Twenty grams of the aluminum nitride prepared as discussed in Example 17 are interdispersed with 5.6 grams of a −325 mesh tungsten metal powder, blended, washed, dried, and pressed as described in Example 17. The resulting interdispersion consists of about 21.5 part by volume aluminum nitride per part by volume of tungsten metal, which corresponds to a volume percent of 4.45 tungsten metal. After pressing, the refractory interdispersion has an impact strength of 4.0 ft.lbs./in.$^2$, a density of 3.93 g./cc. and an average rupture strength, based on tests of 4 transverse rupture bars, of 43,600 p.s.i. The density is 99.82% of the theoretical density. The hardness is 89.9 on the Rockwell A scale.

This specimen is examined metallographically and shown to consist of an interdispersion of tungsten metal with aluminum nitride, the metal having an average particle size of from 1 to 6 microns, and the aluminum nitride having an average particle size of less than 4 microns. X-ray examination shows that the phases present are aluminum nitride, tungsten metal and a small amount of tungsten carbide (W$_2$C). The electrical resistivity is 4.0×10$^5$ ohms.cm. This high electrical resistivity is characteristic of a discontinuous phase of the tungsten metal.

The interdispersion is tested as a cutting tool in a similar manner to that of Example 17. It shows a flank wear of 5 mils after 3 minutes cutting at 340 surface feet per minute on 4340 steel, and 10 mils after cutting 30 seconds at 1000 surface feet per minute; even after cutting a full minute at 1000 surface feet per minute, this interdispersion shows a flank wear of only about 12 to 16 mils.

Example 19

One and one-half pounds of tungsten metal powder are placed in a 1 gallon steel ball mill filled with $\frac{3}{16}$″ steel balls to 40% of its volume. This is covered with 1700 cc. of a high boiling hydrocarbon having a flash point of 185° F., and milled for a period of 3 days at a speed of 60 r.p.m. The tungsten metal powder is separated by sedimentation and centrifugation from the oil, and washed two times with hexane, then with acetone, and finally with water. It is treated with a mixture of 1 liter of concentrated hydrochloric acid and 1.5 liters of distilled water, and heated for one hour at 90° C. This is done to dissolve iron picked up during the milling operation. It is allowed to remain stirring with the hydrochloric acid-water mixture overnight. It is then centrifuged to recover the tungsten and to separate this from the dissolved iron which has been removed by acid treatment, and is washed with a 0.1 normal HCl solution until free of iron. This requires five washes. It is then further washed with distilled water until free of chloride ion, and dried in a vacuum oven. The tungsten powder so obtained has a nitrogen surface area of 3.0 m.$^2$/g., corresponding to an individual particle size of about 100 millimicrons. Chemical analysis shows it to consist of about 98.9% tungsten metal, 0.6% iron, and 0.7% oxygen.

Sixty-six grams of this tungsten powder is ball-milled in a rubber-lined mill with 34 grams of the aluminum nitride prepared as described in Example 17. The mill is filled with alumina balls, approximately ¼" in diameter, which occupy 40% of the volume of the mill. It also contains 350 cc. of a high boiling hydrocarbon, having a flash point of 185° F. After milling overnight at 60 r.p.m., the product is recovered by filtering, washing with hexane, and drying in a vacuum oven. A 25 gram sample is pressed under the same conditions as used in Examples 17 and 18, and the resulting interdispersion is characterized in a similar fashion. It has an impact strength of 5.3 ft.lbs./in.$^2$, a Rockwell A hardness of 90.1, an average transverse rupture strength of 96,325 p.s.i., and a density of 6.98 g./cc. which is 96.14% of the theoretical density of 7.26 g./cc. for this composition. The interdispersion is composed of about 2.94 parts by volume aluminum nitride per part by volume of metal.

On being tested as a cutting tool, on 4340 steel as described in Example 17, this interdispersion shows a flank wear of 5 mils, a total crater width of 25 mils and a crater depth of ¼ mil after 3 minutes cutting at 340 surface feet per minute. After 3 minutes at 500 surface feet per minute, the corresponding figures are a flank wear of 9 mils, a crater width of 27 mils, and a crater depth of ¾ mil. After cutting 30 seconds at 1000 surface feet per minute, the figures are 4 mils flank wear, 20 mils crater width, and a crater depth of ½". Even after cutting at 1500 surface feet per minute, the flank wear after one minute of cutting is only 12 mils, the crater width about 22 mils, and the crater depth 1½ mils.

A metallographic examination of this refractory interdispersion shows a much more uniform distribution of the metallic component throughout the structure than in previous examples. The effect of using the finer particle sized tungsten metal powder is also shown by the smaller average particle size of the metal which ranges from less than 1 micron to about 4 microns, and of the non-metallic components which are all substantially less than 2 microns in average size. This refractory represents one of the preferred embodiments of the invention. It has a continuous phase of metal as shown by its extremely low electrical resistivity of 0.034 milliohm.cm. The improved distribution and the effect of a continuous metal phase can also be noted in the more than doubling of the transverse rupture strength and the increase in hardness, and in cutting tool performance, when this example is compared with Example 18.

Example 20

Sixty-one grams of the tungsten metal powder prepared as described in Example 19 are mixed with 5 grams of chromium metal powder —325 mesh, and 34 grams of the aluminum nitride prepared as described in Example 17. This mixture is milled in 350 cc. of a high boiling hydrocarbon solvent in 1.1 liter capacity rubber-lined steel ballmill. The mill is filled to 40% of its volume with ¼" diameter alumina balls. After milling for 14 hours at 60 r.p.m., the resulting intimate mixture is recovered by centrifugation and washed with hexane until the resulting product is free of the hydrocarbon oil used as a milling fluid. Twenty-five grams of this composition is hot pressed under the conditions described in Example 17. The resulting refractory consists of about 2.67 parts by volume of aluminum nitride per part by volume of a tungsten-chromium alloy containing 13.2 weight percent chromium.

The average rupture strength of this refractory is 67,250 p.s.i., its impact strength is 6.1 ft.lbs./in.$^2$, its Rockwell A hardness is 88.9, and its density 6.87 g./cc. This is 97.44% of the theoretical density.

Metallographic examination of the structure of the refractory shows an extremely uniform interdispersion of metal and aluminum nitride, with the particle size of the nitride ranging from about 2 to 4 microns, and that of the metal ranging from less than 1 micron to about 10 microns. The existence of a continuous metal phase is shown by measurement of the electrical resistivity, which is 0.035 milliohm.cm. Again it is to be noted by comparing this example with Examples 17 and 18, that the rupture strength and the impact strength are improved, as is the cutting tool performance, discussed below.

A portion of this refractory is machined to prepare a cutting tool insert and tested as in Example 17. The following performance was demonstrated: At 340 surface feet per minute, the flank wear is 6 mils, the crater width 25 mils, and the crater depth ½ mil, after a cutting time of 3 minutes. On cutting 3 minutes at 500 surface feet per minute, the flank wear is 8 mils, the crater width 27 mils, and the crater depth 1 mil. On cutting 1 minute at 1500 surface feet per minute, the flank wear is 25 mils, the crater width 18 mils, and the crater depth 1½ mil.

Example 21

Seventy-seven and two tenths grams of the tungsten metal of Example 19 are milled with 19.5 grams of the aluminum nitride of Example 17. Milling is performed in a 1.1 liter rubber-lined ballmill, filled to 40% of its volume with ³⁄₁₆" steel balls, and 350 cc. of a high boiling hydrocarbon oil. Milling is performed at 60 r.p.m. for 24 hours. The resulting intimately mixed tungsten, aluminum nitride powder is recovered from the balls and washed free of the hydrocarbon solvent with hexane, and dried in a vacuum oven. Thirty-six grams of the resulting powder consisting of 1.5 parts by volume of aluminum nitride per part by volume of tungsten, is pressed under the conditions described in Example 17, except the maximum pressure imposed is 6000 p.s.i.

The resulting refractory interdispersion exhibits a rupture strength of 148,000 p.s.i., an impact strength of 7.4 ft.lbs./in.$^2$, a Rockwell A hardness of 85.6, and a density of 9.46 g./cc. This represents 98% of the theoretical density of 9.67 g./cc. calculated for this refractory. The refractory is tested as a cutting tool on cast iron and shows exceptional performance even on interrupted cuts and at high speeds.

Example 22

One thousand three hundred and sixty grams of —325 mesh molybdenum metal powder is placed in a 1 gal. steel ballmill filled to 40% of its volume with steel balls and also containing 1800 cc. of a high boiling hydrocarbon oil. This is milled at a speed of 60 r.p.m. for 3 days, after which the molybdenum powder is separated from the hydrocarbon oil and the steel balls, washed thoroughly with hexane to remove the oil, and dried in a vacuum oven. It is purified with a hydrochloric acid-water treatment in a manner identical to that described for the purification of the tungsten metal powder of Example 19. The resulting, finely divided, molybdenum metal powder has an average particle size of from 100 to 200 millimicrons, and contains only traces of iron as an impurity.

40.8 grams of this material are milled with 19.5 grams of aluminum nitride prepared as described in Example 17, in a 1.1 liter rubber-lined steel ballmill filled to 40% of its volume with ³⁄₁₆" steel balls. The mill also contains 350 cc. of high boiling hydrocarbon oil. Milling is continued for a period of 24 hours at a speed of 60 r.p.m. Following recovery of the intimately mixed molybdenum, aluminum nitride powder from the hydrocarbon oil, washing with hexane to remove the oil, and drying in a vacuum oven, 25 grams of this material are hot pressed under the conditions described in Example 17.

The resulting refractory interdispersion contains about 1.5 parts by volume aluminum nitride per part by volume molybdenum. It has an average transverse rupture strength of 77,825 p.s.i., an impact strength of 11.2 ft.lbs./in.$^2$, a Rockwell A hardness of 83.2, and a density of 5.97 g./cc. Based on the theoretical density for this composition of 6.03 g./cc., this represents 99% of the theoretical density.

Example 23

Forty-one and five tenths grams of the tungsten metal powder of Example 19 and 22.8 g. of the aluminum nitride powder of Example 17 are mixed with 17.8 g. of −325 mesh rhenium metal powder and milled under the same conditions as Example 17. Pressing conditions are also the same as those employed in Example 17, except that a holding time of 15 minutes at 2000° C. is used instead of a holding time of 5 minutes at this temperature. The resulting refractory interdispersion contains about 2.33 parts by volume of aluminum nitride per part by volume of an alloy containing 70 weight percent tungsten and 30 weight percent rhenium. Its transverse rupture strength is 200,000 p.s.i., Rockwell A hardness 91.5, impact strength 45 ft.lbs./in.$^2$, and density 7.20 g./cc., representing greater than 99.5% of the theoretical density for this composition. X-ray examination shows that the interdispersion consists of aluminum nitride and a tungsten-rhenium alloy phase. This interdispersion is employed as a cutting tool in machining cast iron, stainless steel, 4340 steel, as well as several nickel-chromium based superalloys containing aluminum and titanium as precipitation hardening agents. Its cutting performance on these metals is outstanding, exhibiting almost negligible wear even at the highest cutting speeds on all but the superalloys. Even with these extremely hard and strong alloys, it is found possible to cut without excessive wear at high speeds.

Example 24

Thirty-one grams of the aluminum nitride powder of Example 17 and 3.85 grams of the molybdenum powder of Example 22 are mixed with 2.48 grams of −325 mesh pure rhenium powder. These are milled in a 1.1 liter rubber-lined steel mill filled to 40% of its volume with ³⁄₁₆″ steel balls and containing 350 cc. of a high boiling hydrocarbon. Milling is done for 24 hours at 60 r.p.m. and the recovery of the intimately mixed metal, aluminum nitride powder is performed as indicated in previous examples.

Fifteen grams of this powder are pressed at 2000° C. for a period of 5 minutes, after first applying 4000 p.s.i. pressure at a temperature of 1900° C. The resulting interdispersion has a rupture strength of 60,000 p.s.i., an impact strength of 15 ft.lbs./in.$^2$, a density of 3.70, and a Rockwell A hardness of 89. The interdispersion consists of 19 parts by volume of aluminum nitride per part by volume of a 60 weight percent molybdenum-40 weight percent rhenium alloy, and the measured density corresponds to 99% of the theoretical density for this interdispersion.

Example 25

Two and forty-eight hundredths grams of −325 mesh pure chromium metal powder and 3.57 grams of the molybdenum metal powder prepared in Example 22 are mixed with 30.3 grams of aluminum nitride prepared as described in Example 17. The conditions of milling, recovery of solvent and pressing are substantially identical with those described in Example 17. After pressing, the resulting interdispersion contains about 13.3 parts by volume of aluminum nitride per part by volume of an alloy which is 50 volume percent chromium, 50 volume percent molybdenum. The transverse rupture strength of this interdispersion is 102,000 p.s.i., its impact strength is 7 ft.lbs./in.$^2$, and Rockwell A hardness 88.5. The measured density of 3.60 g./cc. represents 99.3% of the theoretical density of this composition. This interdispersion demonstrates high temperature strength with excellent oxidation resistance, even at temperatures in excess of 1000° C.

Example 26

Thirteen and forty-five hundredths grams of the tungsten metal powder of Example 19, and 7.65 grams of the molybdenum metal powder of Example 22 are mixed with 27.7 grams of the aluminum nitride powder of Example 1, and these are milled in a 1.1 liter rubber-lined mill filled to 40% of its capacity with ³⁄₁₆″ steel balls and containing 350 cc. of a high boiling hydrocarbon. Milling is for a period of 24 hours at a speed of 60 r.p.m. After recovering the intimate mixture of aluminum nitride and metal powders as described in previous examples, 18 grams of this composition are pressed under the conditions of pressing described in Example 17. The resulting refractory interdispersion exhibits a rupture strength of 75,000 p.s.i., a Rockwell A hardness of 90, an impact strength of 4 ft.lbs./in.$^2$, and a density of 4.83 grams per cc., corresponding to 97% of the theoretical density for this composition. This interdispersion contains about 5.67 parts by volume aluminum nitride per part by volume of a 50/50 volume percent alloy of molybdenum and tungsten.

Example 27

Five and one-tenth grams of the molybdenum powder of Example 22 are mixed with 0.12 gram of zirconium hydride and 31.0 grams of the aluminum nitride powder of Example 17. These are milled and separated from the oil as described in the previous example. The pressing conditions employed are those of Example 17. The resulting interdispersion consisting of 5 volume percent of a 98% molybdenum-2% zirconium alloy, has a rupture strength of 70,000 p.s.i., a Rockwell A hardness of 91, an impact strength of 10 ft.lbs./in.$^2$, and a density of 3.61 g./cc. This density is very close to 100% of that which is theoretically expected for this composition.

Example 28

Twenty-six grams of the molybdenum metal powder of Example 22 are mixed with 24.4 grams of the aluminum nitride powder of Example 17 and to this is added .6 gram of zirconium hydride. This mixture is milled and recovered as described in previous examples, and 20 grams of it are pressed at 2000° C. using the pressing cycle described in Example 17. The resulting refractory interdispersion exhibits a transverse rupture strength of 160,000 p.s.i., an impact of 30 ft.lbs./in.$^2$, a Rockwell A hardness of 90.5, and a density of 5.05 g./cc. which represents 99% of theoretical density. The interdispersion contains 25 volume percent of a molybdenum-zirconium alloy which is 98 weight percent molybdenum.

The interdispersion performs exceptionally well as a cutting tool on a variety of metals and alloys, with minimum wear. The alloys tested include bronze, an abrasive aluminum-copper precipitation-hardened alloy, a cobalt based superalloy containing chromium and tungsten and carbon as hardening agents, cast iron, and 4340 steel. Only very minor wear rates are encountered using cutting speeds up to 1500 surface feet per minute on all alloys but the cobalt-based superalloy. This alloy can be cut with relatively low wear at a rate up to 400 surface feet per minute. This cutting tool composition is particularly outstanding on interrupted cuts on steel and cast iron, due presumably to its high impact strength, mechanical strength, and hardness.

Example 29

Forty-eight and two tenths grams of a sample of tungsten metal powder containing dispersed within it 1% by weight of 100 millimicron particles of thoria are mixed with 24.5 grams of the aluminum nitride of Example 17. This is milled for 24 hours in a 1.1 liter rubber-lined mill containing 350 cc. of a high boiling hydrocarbon solvent and filled to 40% of its volume with $\frac{1}{16}''$ steel balls. The milling speed is 60 r.p.m. After recovery and removal of the oil as described in previous examples, 25 g. of this material are pressed at a temperature of 2200° C. with a holding time of 1 minute at the top temperature under a pressure of 4000 p.s.i. which is first imposed at 2000° C. The resulting refractory interdispersion consists of about 0.09 part by volume thoria and 3.26 parts by volume aluminum nitride per part by volume of tungsten metal. Its transverse rupture strength is 110,000 p.s.i., its density is 7.20 g./cc., the Rockwell A hardness is 90.9, and the impact strength is 20 ft.lbs./in.$^2$. The density represents 96.2% of the theoretical density for this composition.

Example 30

Twenty and four tenths grams of a sample of finely divided molybdenum powder containing dispersed within it 10 weight percent of thoria in the form of discrete, 100 millimicron crystals are mixed with 26.1 grams of the aluminum nitride of Example 17 and these materials are milled, recovered from the mill and washed free from oil as described in the previous example. Eighteen grams of this material are pressed under the conditions described in the previous example, and the resulting refractory interdispersion exhibits a transverse rupture strength of 90,000 p.s.i., a Rockwell A hardness of 91.5, an impact strength of 15 ft. lbs./in.$^2$, and a density of 4.63 g./cc. This represents 99.5% of the theoretical density for this composition. The interdispersion consists of 20 volume percent of a binder metal phase of molybdenum containing dispersed within it 10 weight percent based on the weight of the molybdenum, of 100 to 200 millimicron particle size discrete thoria particles, and a refractory phase comprising 80% of the interdispersion of finely divided aluminum nitride particles. This material shows a high strength and exceptional creep resistance, even at temperatures up to 1500° C. in inert atmospheres.

Example 31

Three hundred and twenty-two and seven tenths grams of the aluminum nitride of Example 17 and 19.2 g. of the tungsten metal of Example 19 are milled using 2500 g. of tungsten carbide-cobalt cylindrical rod inserts and 350 cc. of a high boiling hydrocarbon oil in a 1.1 liter rubber-lined steel ballmill. Milling is continued for a period of 500 hours at a speed of 60 r.p.m. The milled mixture of tungsten and aluminum nitride is recovered as described in previous examples.

The resulting intimately mixed powder consists of 99 parts by volume of aluminum nitride and one part by volume of tungsten metal, with both phases having particle sizes less than one micron. Fourteen grams of this powder are pressed under a nitrogen atmosphere with the pressure being applied at a temperature of 2000° C. A pressure of 4000 p.s.i. is employed.

The resulting dense body of the invention consists of an interdispersion of 99 parts by volume of aluminum nitride with 1 part by volume of tungsten metal. The density is 3.42 g./cc., which is the theoretical density for this composition. This body is hard, strong, corrosion and erosion resistant, and is well suited for high temperature structural applications.

Example 32

Two hundred and forty-four and five tenths grams of the aluminum nitride of Example 17 and 19.2 g. of the tungsten metal of Example 19 are blended, milled, and recovered from the mill as described in the previous example. Pressing is also performed under the same conditions, and the resulting dense body of the invention consists of an interdispersion of 75 parts by volume of aluminum nitride with 1 part of volume of tungsten metal. The density of the hot pressed body is 3.34 g./cc., which is the theoretical density of this composition. This composition is stronger and more ductile, but otherwise similar in properties and utility to the composition of Example 31.

Example 33

An ammonium tungstate solution is prepared by dissolving tungstic oxide in an excess of concentrated ammonium hydroxide. This solution contains 11.2% tungstic oxide. Six thousand three hundred and seventeen grams of the ammonium tungstate solution is adjusted to a volume of 6 liters. 1821 g. of a 22% titania sol, the titania being in the form of 20 millimicron spherical aggregates of 5 to 10 millimicron particles, is mixed with 1713 g. of a 3.5% alumina sol, the alumina being in the form of 20 millimicron particles. The pH of the mixed sols is adjusted to 1 with hydrochloric acid, and the mixture is then adjusted to a total volume of 6 liters. Twenty-nine hundred seventy cc. of an 18.5% aqeous hydrochloric acid solution is adjusted to 6 liters in volume with water. A 6 liter heel of distilled water is adjusted to a pH of 1 with hydrochloric acid.

The solution of the mixed sols of titania and alumina, the solution of the ammonium tungstate, and the solution of the hydrochloric acid-water are run at equal rates simultaneously into the vigorously agitated heel.

The resulting precipitated mixture of tungstic oxide, titanium dioxide, and alumina are washed by decantation and centrifugation, and dried in an air oven overnight at 250 to 300° C. The weight recovered at this stage is 1076 g. This material is then fired in a furnace at 400–450° C. overnight, and the weight decreases to 956 g. This material is then hydrogen reduced in an electrically heated furnace under a current of pure dry hydrogen, first at 600° C. and finally at 1000° C. Under these conditions, the tungstic oxide is transformed to tungsten metal in a colloidal mixture with titanium monoxide and alumina.

Eight hundred twenty-six grams of this mixture are recovered, and analysis shows it has an oxygen content at this point of 22.1%. One hundred forty-one grams of carbon is blended with this material and it is heated in a ceramic tube furnace in a nitrogen atmosphere to a temperature of 1250° C. The atmosphere is then changed to one of ammonia and the system is held at 1250° C. for 15½ hours, following which it is heated up to 1550° C. and held at this temperature for 22½ hours.

The resulting product is a mixture on an intimate colloidal scale of metallic tungsten and titanium nitride, with a small amount of alumina and aluminum nitride. X-ray examination of this powder shows it to consist of tungsten crystallites, 30 millimicrons in diameter, along with titanium nitride, 17.5 millimicrons in diameter. The alumina and aluminum nitride are below the limit of X-ray detection.

The product is somewhat aggregated, as indicated by its nitrogen surface area of 2 m.$^2$/g., which is considerably less than that which should be obtained for a mixture of non-aggregated crystals of the size indicated by X-rays.

Two hundred seventy-four grams of this composition, 1.5 grams of a one micron sized pure cobalt powder, and 4996 g. of tungsten rod inserts are loaded into the steel-lined ballmill, along with 180 cc. of nonvolatile hydrocarbon oil. The capacity of the mill is about 1300 cc. Milling is performed at a speed of 60 r.p.m., for 5 days.

During milling, 13 grams of tungsten is picked up by the product from the tungsten rod inserts due to partial attrition during the milling operation. This powder is found by chemical analysis to be composed of 2.59 parts by volume of titanium nitride and 0.58 part by volume of alumina per part by volume of the metal which is 98% by volume tungsten and 2% by volume cobalt.

A number of refractory samples are fabricated from this powder by hot pressing at a temperature of 1800 to 1845° C., using a pressure of 4000 p.s.i. and a hold at temperature of 1 minute. The average properties obtained are a density of 8.52 g./cc., a Rockwell A hardness of 90, a transverse rupture strength of 158,000 p.s.i., and an impact strength of 37 ft.lbs./in.$^2$. The theoretical density for this composition calculated by assuming that the specific volumes of the constituents are additive, is 8.50 g./cc.

This refractory interdispersion proves to be an excellent cutting tool, as shown in the following tests. Samples of a hardened steel, grade 4340, of Brinnell hardness 351, are turned on a lathe using a feed of 10 mils, a depth of cut of 50 mils, and a speed expressed in surface feet per minute (s.f.m.) of 900. After 3 minutes of cutting, the average flank wear is approximately 5 mils, the highest local wear observed is 6 to 8 mils, and the crater depth is about 1.25 mils.

In a turning test where the feed is 30 mils, the depth of cut ⅛″ and the surface speed 300 s.f.m., turning for 1 minute gives a local wear of 2 mils and average wear of 2 mils, and a zero crater depth. Tool life curves are run on the same steel, using a speed of 500 s.f.m., a 20 mil feed, and a ¹⁄₁₆″ depth of cut, and the tool performs without failure for a period of 19 minutes and 45 seconds. At the conclusion of this test, the wear and cratering are not excessive, although a small amount of chipping causes some deterioration in the surface finish of the refractory interdispersion at this point. Under similar conditions at a speed of 400 s.f.m., the life of this refractory is 14 minutes and 15 seconds.

As a further indication of the exceedingly high toughness of this tool, it is used as a single tooth in a milling head by climb milling to cut malleable cast iron at a depth of cut of ¹⁄₁₀″, a feed of 40 mils per tooth, and a speed of 196 s.f.m. No observable crater wear or flank wear, and no failure of the tool results, even after cutting 66 inches of metal, at which point the test is stopped.

Thus, this tool performs in an outstanding fashion under both the heaviest type of practical milling conditions, and under conditions where only the most wear resistant ceramic tools are normally employed.

Example 34

A steel ballmill with a volume of 1.3 liters is loaded with 114 grams of finely divided titanium nitride, 17.1 grams of aluminum nitride, and 90 g. of ballmilled tungsten. Also loaded into the mill is 450 g. of a hydrocarbon oil having a flash point of 130° C., and 5.75 kg. of tungsten inserts. This mixture is ballmilled for 5 days. Recovery of the product is effected by transferring the slurry from the ballmill into a resin kettle, the slurry settles, and the supernatant liquid is siphoned off. The wet cake is repeated washed with hexane and is then dried under vacuum. The resin kettle with the dry powder is opened in an inert atmosphere in a dry box, and is screened through a U.S. 70 mesh sieve.

One sample of this 70 mesh powder interdispersion is hot pressed according to the following procedure: The sample is heated to 1900° C. in a graphite mold and held for 6 minutes. Four thousand p.s.i. pressure is then applied and held for a total of 5 minutes, and the sample is then allowed to cool rapidly. This is done under ½ atmosphere of nitrogen.

The resulting specimen has a transverse rupture strength of 136,100 p.s.i., an impact strength of 6 ft.lbs./in.$^2$, and a Rockwell A hardness of 90.1. The density of 7.7 g./cc. is 100% of theoretical for this composition, which contains about 3.4 parts by volume titanium nitride and about 0.8 part by volume aluminum nitride per part by volume of tungsten.

This refractory interdispersion is machined into a cutting tool insert and employed as a cutting tool on 4340 grade steel. This is an excellent high speed cutting tool at 900 surface feet per minute, using a feed of 10 mils per revolution and a depth of cut of 50 mils. After 3 minutes of operation, it has an average flank wear of only 7 mils, and a crater depth of 1 mil. At 300 surface feet per minute, also on 4340 grade steel, using a heavy feed of 30 mils and a depth of cut of ⅛″, this tool cuts satisfactorily and resists fracture. After one minute it has an average flank wear of only 3 mils, and no measurable crater wear.

This tool machines for 30 minutes without failure on 4340 steel, at 370 surface feet per minute, a ⅛″ depth of cut and 20 mil feed, and has a flank wear of only 4 mils and a crater depth of 1 mil. The finish on the work piece is excellent.

Examples 35–49

The following examples illustrate other interdispersions which are prepared in a manner similar to that described in Example 1. The specific conditions used in the milling and hot pressing operations, the chemical analysis of the powder, and the nominal composition and properties of the pressed pieces are listed in the attached Tables 1 and 2. The performance of the refractory interdispersions as cutting tips is described separately for each example.

TABLE I

| Example Number | Starting Material Amounts (Grams) | | | | | Ball Milling Conditions | | | Powder Analysis | | | | X-ray Crystal Size (Mµ) | |
|---|---|---|---|---|---|---|---|---|---|---|---|---|---|---|
| | TiN | AlN | Al$_2$O$_3$ | W | Co | Inserts | Weight (Grams) | Milling Time | Percent C | Percent O | Percent N | N$_2$ Surface Area m.$^2$ g. | TiN | W |
| 34 | 114 | 17.1 | | 90.0 | | W | 5.75 | 5 Days | 1.15 | 1.68 | 10.26 | 10 | 19 | 30 |
| 35 | 114 | 17.1 | | 90.6 | 1.6 | W | 5.58 | 6 Days | 1.34 | 1.80 | 8.64 | 8.6 | | |
| 36 | 66.6 | 9.9 | | 90.0 | | W | 7.86 | 5 Days | 1.11 | 2.01 | 8.37 | 11 | 19 | 27 |
| 37 | 89.5 | 17.4 | | 125 | | W | 6.64 | do | 0.24 | 3.12 | 9.07 | | 22 | 30 |
| 38 | 64.0 | $^1$6.2 | | 60 | | W | 7.00 | 16 Hours | 0.81 | 0.80 | 11.39 | 5.6 | 37 | 29 |
| 39 | 72.8 | $^1$7.0 | | 77.2 | | WC | 3.44 | 15 Hours | 1.18 | 4.80 | 6.39 | 8.8 | 27 | 23 |
| 40 | 94.0 | | 17.2 | 100 | | W | 7.50 | 8 Days | 1.50 | 1.43 | 8.00 | 8.6 | | |
| 41 | 114 | 17.1 | | 169 | | WC | 4.00 | 5 Days | 0.81 | 0.94 | 11.10 | 6.1 | 40 | 25 |
| 42 | 63 | 9.45 | | 69.5 | | W | 4.70 | 16 Hours | 0.73 | 0.70 | 8.34 | 5.5 | 32 | 25 |
| 43 | 54.3 | 8.15 | | 104.2 | | W | 4.72 | do | 0.63 | 0.72 | 5.57 | 4.6 | 39 | 25 |
| 44 | 47.8 | 7.17 | | 139.0 | | W | 4.71 | do | 1.23 | 2.08 | 9.54 | 11 | 22 | 33 |
| 45 | 114 | 17.1 | | 55.2 | 1.2 | W | 5.00 | 6 Days | | | | | | |
| 46 | 39.9 | $^1$1.78 | | 16.6 | | W | 6.38 | 16 Hours | | | | | | |
| 47 | 36.1 | $^1$2.51 | | 25.0 | .38 | W | 6.24 | do | | | | | | |
| 48 | 43.5 | | | 30 | | W | 7.00 | do | | | | | | |
| 49 | 43.5 | | | 7.0 | .19 | W | 6.31 | do | | | | | | |

$^1$ = atomized aluminum replacing aluminum nitride.

TABLE II

| Ex. No. | Pressing Conditions | | | Mechanical Properties | | | | Refractory Composition | | | | | |
|---|---|---|---|---|---|---|---|---|---|---|---|---|---|
| | Goal Temp., °C. | Hold Time (min.) | Atmos. | Trans. Rupture Strength (p.s.i.) | Rockwell A Hardness | Observed Density / Calc. Density | (g./cc.) | Parts Refractory Per Part Metal | | | Metal Phase Composition | | |
| | | | | | | | | TiN | AlN | Al₂O₃ | Percent W | Percent Co. | Percent Others |
| 34 | 1,900 | 6 | N₂ | 136,100 | 90.1 | 7.7/7.75 | | 3.4 | .8 | | 100 | | |
| 35 | 1,750 | 5 | N₂ | 176,300 | 90.3 | 8.23/8.35 | | 2.1 | .6 | | 97.9 | 2.1 | |
| 36 | 1,810 | 2 | Vacuum | | 90.4 | 9.07/9.12 | | 2.1 | .5 | | 100 | | |
| 37 | 1,800 | 1 | do | 148,400 | 86.2 | 8.71/8.53 | | 2.9 | .6 | | 100 | | |
| 38 | 1,500 | 4 | do | 150,400 | 88.8 | 8.06/7.86 | | 3.0 | .6 | | 100 | | |
| 39 | 1,600 | 4 | do | 168,500 | 88.8 | 7.96/8.01 | | 3.4 | .5 | | 100 | | |
| 40 | 1,800 | 2 | do | 105,900 | 90.6 | 8.49/8.69 | | 2.9 | | .6 | 100 | | |
| 41 | {1,900 / 1,800} | 6 / 4 | do | 131,600 / 127,400 | 91.0 / 91.3 | 8.53/8.86 / 8.65/8.86 | | 2.4 / 2.4 | .6 / .6 | | 84.6 / 84.6 | | (¹) / (¹) |
| 42 | 1,850 | 4 | do | 104,000 | 87.8 | 7.60/7.97 | | 3.1 | .8 | | 100 | | |
| 43 | 1,850 | 4 | do | 123,700 | 86.0 | 8.99/9.43 | | 1.8 | .4 | | 100 | | |
| 44 | 1,825 | 4 | do | 164,500 | 84.1 | 10.71/10.61 | | 1.2 | .3 | | 100 | | |
| 45 | 1,780 | 5 | do | | | 7.73/7.86 | | 3.1 | .8 | | 97.5 | 2.5 | |
| 46 | 1,700 | 4 | do | 136,600 | 98.0 | 7.97/8.03 | | 3.7 | .3 | | 100 | | |
| 47 | 1,600 | 4 | do | 138,900 | 87.4 | 8.13/8.05 | | 3.5 | .5 | | 98.1 | 1.9 | |
| 48 | 1,750 | 4 | do | 116,400 | 88.4 | 8.50/8.56 | | 3.4 | | | 100 | | |
| 49 | 1,750 | 4 | do | 92,600 | 88.2 | | | 6.0 | | | 97.2 | 2.8 | |

¹ 15.4 wc/cc.

Example 35

A cutting tool is fabricated as described in Example 1 from the pressed billet shown for Example 46 in Tables 1 and 2. This cutting tool is tested on 4340 grade steel at 500 surface feet per minute, using a 10 mil feed and 50 mil depth of cut. The tool performs satisfactorily. After 3 minutes without failure, it exhibits an average flank wear of 4 mils and a crater depth of only 1 mil. At 200 surface feet per minute, using a 1/16″ depth of cut and a 30 mil feed, this tool exhibits no flank wear and no crater wear, when operated for 1 minute. In another test at 300 surface feet per minute, using again a 1/16″ depth of cut and a 20 mil feed, this tip operates for 30 minutes without failure, giving an excellent finish to the work piece, and has a flank wear of only 4 mils and a crater depth of only 1 mil.

Example 36

A molybdenum tray is loaded with 73 g. of an active colloidal titanium nitride in an inert atmosphere, and is transferred into a ceramic tube furnace. This material is fired for 16 hours at 1200° C. under an ammonia atmosphere. The furnace is opened in air and 69 g. of a friable brown powder is recovered. This material has the following analysis: 2.16% oxygen, 0.04% carbon, 77.1% titanium, and 20.55% nitrogen. This powder has a surface area of 7.3 m.²/g., corresponding to a particle size of 155 millimicrons, and X-ray examination reveals the only phase present to be titanium nitride. A refractory dispersion is prepared from this titanium nitride, in combination with aluminum nitride and tungsten, as in Example 34, but using the conditions shown in Tables 1 and 2 for Example 36. The cutting tool made from this material performs in an excellent manner when used to cut 4340 steel. At a surface speed of greater than 900 surface feet per minute and a 50 mil depth of cut and 10 mil feed, this tool exhibits a flank wear of 4 mils and a crater depth of 2 mils, when allowed to cut for 3 minutes. This tool operates without failure and produces an excellent finish on the work piece. On 4340 steel at 435 surface feet per minute, employing a 1/8″ depth of cut and a 30 mil feed, it has a flank wear of only 2 mils and no measurable crater wear after one minute of operation. This cutting tool is used to clean the scale from a new log of 4340 steel, and cuts for a total length of 36″ with a flank wear of only 4 mils and a crater depth of 2.5 mils, giving an excellent finish to the work piece. The conditions here are 320 surface feet per minute, 20 mil speed and 1/8″ depth of cut.

Example 37

From the hot pressed billet prepared for Example 37 as shown in Tables 1 and 2, a cutting tool is prepared. This cutting tool tested on cast iron at 500 surface feet per minute, using a 20 mil feed and a 50 mil depth of cut, cuts for 91 minutes without failure. Also on cast iron and at 760 surface feet per minute, with the same conditions of depth of cut and feed, it cuts for 43 minutes without failure.

Another pressed interdispersion from this same powder gives a cutting tool having a tool life of 43 minutes and 30 seconds on 4340 steel, at 400 surface feet per minute, 20 mil feed and a 1/16″ depth of cut. The same tip is used in climb milling on malleable cast iron at 196 surface feet per minute, using a depth of cut at 100 mils and a feed of 40 mils per tooth and cuts a total of 23 1/8″ before failure.

Example 38

Using commercial titanium nitride, a hot pressed refractory dispersion is prepared as in Example 34, using the conditions shown for Example 38 in Tables 1 and 2. A cutting tool is prepared from this material which performs in an excellent manner on steel at 400 surface feet per minute, and shows low wear and long tool life.

Example 39

A cutting tool is fabricated as described in Example 34, using a finely divided titanium nitride. This is a hard, tough cutting tool, and performs satisfactorily on steel at 300 surface feet per minute, with long tool life.

Example 40

A high speed cutting tool is prepared from the hot pressed refractory interdispersion shown for Example 40 in Tables 1 and 2. This is prepared following the procedure of Example 34, and is a thermally shock stable cutting tool. This cutting tool cuts for 9 minutes and 12 seconds on 4340 steel of Brinnell hardness 203, when tested at 550 surface feet per minute, using a 20 mil feed and a 1/16″ depth of cut.

Example 41

The first cutting tool of Example 41 in Tables 1 and 2 is tested on 4340 steel and performs in an excellent manner, as shown by the following: At 850 surface feet per minute, using a 50 mil depth of cut and a feed of 10 mils, this tool machines for 3 minutes without failure and has a flank wear of only 4 mils and a crater depth of only 1.5 mils. At 370 surface feet per minute, using a 1/8″ depth of cut and a 20 mil feed, this tool operates for 1 minute with a flank wear of only 1 mil and no measurable crater wear. Also at 370 surface feet per minute, with a 1/8″ depth of cut and a 30 mil feed, it performs in an excellent manner for 15 minutes and 27 seconds.

The second cutting tool, prepared from the same powder interdispersion, with properties shown in the tables, also displays excellent cutting tip properties when tested on 4340 steel at 1000 surface feet per minute. It performs satisfactorily for 3 minutes, with a flank wear of only 3 mils and a crater depth of 5.5 mils. At 325 surface feet per minute, it cuts satisfactorily for 10 minutes with a flank wear of only 2 mils and a crater depth of only ¼ mil. In a test of climb milling on malleable cast iron, this cutting tip shows toughness exceeding that of other commercial cutting tips used on this type of material. This tool is tested at 257 surface feet per minute, 100 mil depth of cut at feeds of 8.2 mils, 17 mils, and 37.5 mils. Under all of these conditions it runs satisfactorily without failure.

Example 42

The hot pressed billet shown for Example 42 in Tables 1 and 2 is machined into a cutting tool and is tested on 4340 steel of Brinnell hardness greater than 307. This tool at a surface speed of 370 surface feet per minute, a 1/16" depth of cut, and 20 mil feed, has a tool life of 66 minutes and 30 seconds. At 530 surface feet per minute, this tool has a life of 8 minutes.

Example 43

A refractory interdispersion is prepared as in Example 34, and under the conditions shown in Tables 1 and 2 for Example 43. This material makes a strong, tough cutting tool, which has a tool life of 23 minutes and 30 seconds on 4340 steel at 400 surface feet per minute.

Example 44

An extremely tough and strong refractory interdispersion shown for Example 44 in Tables 1 and 2 is fabricated into a cutting tool for steel and tested on 4340 steel at 410 surface feet per minute, using a 1/16" depth of cut and a 20 mil feed. This performs satisfactorily for greater than 9 minutes on 4340 steel.

The next five examples are prepared as in Example 34, except that after the milling period indicated in the table for the slurry of the titanium nitride and aluminum nitride, the finely divided tungsten is added to the ballmill and dispersed in the slurry by an additional two hour milling.

Example 45

A hard refractory cutting tool for steel is prepared in Example 34, from the refractory interdispersion shown for Example 45 in Tables 1 and 2. In machining tests on 4340 grade steel at 1000 surface feet per minute, using a 50 mil depth of cut and a 10 mil feed, this refractory cutting tool has a flank wear of 4 mils and a crater depth of 1.5 mils, after cutting for 3 minutes without failure. On the same steel at 360 surface feet per minute, with a ⅛" depth of cut and a 30 mil feed, this tool exhibits a flank wear of only 1 mil and no measurable crater wear after 1 minute of operation.

Example 46

A hot pressed billet is prepared in the same manner as that of Example 34, with the exceptions noted above. The method of preparation and physical properties are given in Tables 1 and 2.

A cutting tool fabricated from this material is an excellent cutting tool on steel and cast iron, when used at a feed of 300 to 500 surface feet per minute, a depth of cut of 1/16", and a feed of 10 mils.

Example 47

This composition shown in Tables 1 and 2 and prepared as described above is an excellent cutting tool on cast iron, at 400 surface feet per minute, a depth of cut of ⅛" and a feed of 20 mils.

Example 48

A cutting tool is fabricated as described in Example 34, from the pressed refractory interdispersion shown for Example 48 in Tables 1 and 2. This cutting tool has excellent wear resistance when used to cut 4340 steel at 300 surface feet per minute using a depth of cut of ⅛" and a feed of 10 mils.

Example 49

The hot pressed refractory interdispersion shown in Tables 1 and 2 for Example 49 is fabricated into a steel cutting tip. This tool exhibits exceptional wear resistance and thermal shock stability, and will cut steels at speeds up to 500 surface feet per minute, with good tool life.

Example 50

A ballmill is loaded with 92 grams of commercial vanadium nitride, —325 mesh, and ballmilled for 5 days in a steel mill with 6000 g. of tungsten inserts and 150 g. of a hydrocarbon oil. To this ballmilled slurry of finely divided vanadium nitride is added 77.8 g. of a previously ballmilled tungsten powder. This is then mixed for 2 hours by ballmilling. The resulting slurry is then transferred to a resin kettle and is dried under vacuum. The dried powder is then unloaded in an inert atmosphere and screened through a 70 mesh screen. One sample of this powder interdispersion is fabricated into a hot pressed billet and cutting tool as described in Example 34. Mechanical tests on this interdispersion give the following results: transverse rupture strength of 112,200 p.s.i. Rockwell A hardness of 86.4, and a density of 9.18 g./cc. This density is nearly 98% of that expected for this material, which has a nominal composition of 3 parts by volume vanadium nitride per part by volume of tungsten metal.

This material is a good cutting tool for steel, showing good resistance to wear and to thermal shock.

Example 51

Thirty-six grams of colloidal corundum powder having a surface area of 29 m.$^2$/g. and an average crystallite size of around 40 millimicrons are loaded into a 2 quart steel mill with 40 g. of the titanium nitride powder of Example 1, six grams of the aluminum nitride powder of Example 17, and 93 grams of the tungsten metal powder of Example 19.

Three hundred forty-five milliliters of a high boiling hydrocarbon oil having a flash point of 185° F. and 6622 grams of tungsten metal rod inserts are also loaded into the mill. The tungsten metal inserts are in the form of small cylinders, ¼" in diameter and ¼" long. The mill is loaded and closed in a nitrogen atmosphere to prevent oxidation of the material during the milling operation. The mill is rotated on rubber-lined rollers for a period of 5 days at 90 revolutions per minute.

The mill is connected to a vacuum system and the contents are dried in vacuum by heating the outside of the mill with water vapor. The resulting finely divided powder interdispersion of alumina, nitrides and metal is recovered from the mill and separated from the tungsten inserts. These operations are carried out in a nitrogen atmosphere.

The tungsten inserts lose 29 g. in the 5 day milling operation. This amount, added to the 93 g. of tungsten metal powder originally loaded into the mill, gives a total of 122 g. of tungsten metal incorporated into the composition.

Chemical analysis of the powder interdispersion shows that it contains about 18% $Al_2O_3$, 20% TiN, 3% AlN, and 59% W. Surface area is 11 m.$^2$/g.

Twenty-three grams of this powder are placed in a carbon mold, in an inert atmosphere, using molybdenum metal discs as separators. The temperature is raised to 1775° C. under vacuum, and after 5 minutes a pressure of 4000 pounds per square inch is imposed. Temperature and pressure are held for 2½ minutes. Pressure is then removed, the sample is allowed to cool and is then removed from the furnace.

The resulting refractory compact of this invention is cut with a diamond saw into specimens for testing transverse rupture strength, impact strength, hardness on the Rockwell A scale, and density. One section is machined in the form of a metal cutting tool insert. The transverse rupture strength is 125,000 p.s.i., the impact strength is 17 ft.lbs./in.$^2$, and the Rockwell A hardness is 91.8. The density is 8.12 g./cc., which is greater than 99% of the theoretical density to be expected for this composition, based on the specific volumes of the original components.

Metallographic examination of the compact shows that the alumina, the tungsten and the nitride phase are present within a square region 10 microns on edge, and of ten such 100 sq. micron regions examined, all exhibit these same structural characteristics. The compacts contain 1.5 parts of alumina, 1.2 parts of titanium nitride and 0.3 part of aluminum nitride per part of tungsten.

A cutting tool insert of this composition is tested on 4340 steel, using a depth of cut of 1/8", a surface speed of 300 surface feet per minute, and a feed rate of 0.030" per revolution. After 1 minute of cutting, the flank wear is 2 mils and the crater depth is 1/2 mil.

This cutting tool insert can cut 4340 steel at a speed of 900 surface feet per minute, using a depth of cut of 0.050" and a feed rate of 0.010" per revolution. Under these conditions the average flank wear is 6 mils in 3 minutes, and the crater depth is 1 mil.

Another cutting tool of this composition is used as a single tooth in a milling head by conventional milling, to cut hardened steel, grade 4340, of Brinnell hardness 330, at a depth of cut of 50 mils, a feed of 7 mils per tooth, and a speed of 474 surface feet per minute. Average flank wear is only 12 mils, and no failure or chipping of the tool results, even after cutting 240 inches of metal, at which point the test is stopped. Surface finish of the metal at this point is still very good. A commercial wear resistant cutting tool of tungsten carbide modified with titanium carbide and tantalum carbide tested under the same conditions, cuts only 48 inches of metal, at which point the test is stopped due to deterioration in the surface finish of the metal. Average flank wear of the commercial tool at this point is 24 mils.

Still another tool of this composition is used as a single tooth in a milling head by climb milling to cut malleable cast iron at a depth of cut of 1/10", a feed of 40 mils per tooth, and a speed of 196 surface feet per minute. No crater or flank wear, and no failure of the tool results, even after cutting 66 inches of metal, at which point the test is stopped.

Example 52

Fifty-one grams of the alumina powder of Example 51, 55 g. of titanium nitride powder of Example 1, 8 g. of aluminum nitride powder of Example 19, and 81 g. of molybdenum metal powder of Example 7 are placed in a ballmill with 350 milliliters of hydrocarbon oil and 4883 g. of molybdenum metal rod inserts.

Milling is carried out as described in Example 51 as is the recovery of the final product. The molybdenum inserts do not show weight loss during the milling operation.

The resulting intimate interdispersion of this invention is shown by chemical analysis to contain 25.5% by weight $Al_2O_3$, 27.5% TiN, 4% AlN, and 43% Mo.

Seventeen grams of this powder are placed in a carbon die and pressed in the equipment described in Example 51, using the same pressing conditions at 1725° C. The resulting refractory interdispersion has a transverse rupture strength of 125,000 p.s.i., an impact strength of 14 ft.lbs./in.$^2$, and a Rockwell A hardness of 91.8. The density is 5.86 g./cc., which is 100% of the theoretical density to be expected for this composition.

Metallographic examination of the refractory interdispersion shows an interdispersion of alumina, molybdenum and nitrides. The average X-ray crystallite size of the alumina is 420 millimicrons, the average X-ray crystallite size of the molybdenum is 71 millimicrons, and the average X-ray crystallite size of the titanium nitride is 100 millimicrons. The metallographic examination shows that all of the components are present within a square region of 10 microns on edge, and of ten such 100 square micron regions examined, nine exhibit these same structural characteristics. The dispersion consists of about 1.5 parts of alumina, 1.2 parts of TiN, and 0.3 part of AlN per part of molybdenum.

The cutting tool insert of this material, when used to cut 4340 steel at a speed of 900 surface feet per minute, using a depth of cut of 0.050" and a feed rate of 0.010" per revolution shows a flank wear of 6 mils in 3 minutes and a crater depth of 1 mil.

Example 53

Two thousand grams of a 325 mesh alpha tabular alumina, commercially available as grade T–61 alumina powder is loaded into a steel mill half filled with steel balls. Two hundred grams of water are added and the mill is rotated at 35 r.p.m. for 144 hours. After the milling operation, the alumina is recovered, treated with a mixture of hydrochloric and nitric acid to remove the iron, washed with water, and dried.

The milled alumina powder has a surface area of about 9 m.$^2$/g. and an average particle size of around 2 microns.

Thirty-six grams of this alumina powder, 40 g. of the titanium nitride powder of Example 1, and 6 g. of the aluminum nitride powder of Example 17 are placed in a ballmill along with 5837 g. of the tungsten inserts used in Example 51, and about 200 milliliters of hydrocarbon oil. Milling is continued for 5 days under conditions as described in Example 51.

The resulting finely divided powder dispersion is recovered from the mill and separated from the tungsten inserts as in Example 51. These operations are carried out in a nitrogen atmosphere.

The tungsten inserts lose 48 g. in the 5 day milling operation.

Seventy grams of tungsten metal powder of Example 19 and all the powder interdispersion previously recovered from the mill are placed in a mill with the same amount of tungsten inserts and hydrocarbon oil used above. Milling is continued for 2 hours, as described in Example 51. The resulting finely divided powder interdispersion of alumina, mixed nitrides and tungsten is recovered from the mill and separated from the tungsten inserts in an inert atmosphere as in Example 51. The tungsten inserts do not lose any weight in the 2 hour milling operation.

Twenty-three grams of the product are placed in a graphite mold in an inert atmosphere. The temperature is raised to 1775° C. under vacuum and 4000 p.s.i. of pressure is imposed after 5 minutes. Temperature and pressure are held for 2 minutes. Pressure is then removed, the sample is allowed to cool and then removed from the furnace.

The refractory compact obtained is substantially dense, very strong and has excellent impact strength. This refractory interdispersion is an excellent cutting tool for steel. It contains 1.5 parts of alumina, 1.2 parts of TiN and 0.3 part of AlN per part of tungsten.

A cutting insert of this composition is used as a single tooth in a milling head by convention milling to cut hardened steel, grade 4340, of Brinnel hardness 330, at a depth of cut of 50 mils, a feed of 7 mils per tooth, and a speed of 474 surface feet per minute. Average flank wear is only 20 mils after cutting 96" of metal, at which point the test is stopped.

Example 54

Twenty-seven grams of the alumina powder of Example 51, and 35.7 g. of the titanium nitride powder of the same example, are placed in a ballmill, along with the same amount of tungsten inserts and hydrocarbon oil as described in Example 51.

Milling is carried out in the same way as described in Example 51, as is the recovery of the final product. The tungsten inserts lose 25 g. in the 5 day milling operation.

Sixty-two and two tenths grams of the tungsten metal powder of Example 19 and all the powder interdispersion previously recovered from the mill are placed in a steel mill with the same amount of tungsten inserts and hydrocarbon oil used above. Milling for 2 hours is carried out as described in Example 51, as is the recovery of the product. The resulting finely divided powder interdispersion of alumina, titanium nitride and tungsten is recovered from the mill and separated from the tungsten inserts in an inert atmosphere. There is no weight loss of the tungsten inserts during the milling operation.

Twenty-three grams of this powder are loaded into a graphite mold and heated to 1680° C. After 5 minutes at this temperature, 4000 p.s.i. of pressure are applied and held for 1 minute. The pressure is then released, the sample is allowed to cool and is then removed from the furnace.

The refractory compact obtained is substantially dense, very strong, very hard, and is useful for high speed metal turning under conditions where commercial tools are unsatisfactory. It contains 1.5 parts of alumina and 1.5 parts of TiN per part of tungsten.

Example 55

Twenty-four grams of the alumina powder of Example 51, 14.1 g. of the titanium nitride powder of Example 1, and 2.11 g. of the aluminum nitride powder of Example 17 are placed in a ballmill, along with the same amount of tungsten inserts and hydrocarbon oil as described in Example 51.

Milling is carried out for 5 days as described in Example 51, and so is the recovery of the product. The tungsten inserts lose 22 g. during this milling operation.

The powder interdispersion obtained is loaded again in a ballmill along with 37.75 g. of tungsten metal powder of Example 19. Milling for 2 hours, drying and recovery of the product are as described in Example 54. The tungsten inserts do not show any weight loss during this milling operation.

Twenty-three grams of this product are placed in a carbon mold and heated in vacuum at 1650° C. After 5 minutes, 4000 p.s.i. of pressure are applied and held for 1 minute. The pressure is then released, the sample is allowed to cool and is then removed from the furnace.

The refractory compact obtained is substantially dense, very strong, and is very hard. It contains 1.95 parts of alumina, 0.84 part of TiN, and 0.21 part of AlN per part of tungsten metal. It is useful for turning metal under high speed conditions at feed rates where commercial ceramic tools fail.

Example 56

Sixty grams of the alumina powder of Example 51, 16.34 g. of the titanium nitride of Example 1, and 2.44 g. of the aluminum nitride of Example 17 are placed in a ballmill with 200 milliliters of hydrocarbon oil and 5981 g. of tungsten metal rod inserts.

Milling is carried out as described in Example 51, as is the recovery of the product. The tungsten inserts lose 33 g. in the 5 day milling operation.

The powder interdispersion recovered from the milling operation and 87 g. of the tungsten metal powder of Example 19 are placed in a ballmill with the same amount of tungsten inserts and hydrocarbon oil used in the previous milling operation. Milling is carried out for 2 hours, as described in Example 51, and so is the recovery of the product. The resulting finely divided powder interdispersion of alumina, mixed nitrides and tungsten is recovered from the mill and separated from the tungsten inserts in an inert atmosphere. There is no weight loss of the tungsten inserts during the milling operation.

Twenty-three grams of this powder are loaded into a graphite mold and heated to 1730° C. After 5 minutes at this temperature, 4000 p.s.i. of pressure are applied and held for 1 minute. The pressure is then released, the sample allowed to cool and then removed from the furnace.

The refractory compact obtained is substantially dense, has a transverse rupture strength of 127,000 p.s.i. and an impact strength of 5 ft.lbs./in.² It contains 2.4 parts of alumina, 0.48 part of TiN, and 0.12 part of AlN per part of tungsten. It demonstrates outstanding utility as a tool for cutting metal.

Example 57

One hundred and fourteen grams of titanium nitride, 17.1 g. of aluminum nitride, and 50 g. of a finely divided molybdenum powder are loaded into a steel ballmill and ballmilled for 5 days with 3.96 kg. of molybdenum inserts. This slurry is worked up and prepared for pressing and is pressed as in Example 34, except that the powder is held at 1835° C. for 5 minutes before pressure is applied. This resulting refractory interdispersion has a transverse rupture strength of 170,100 p.s.i., a Rockwell A hardness of 90.8, and a density of 6.05 g./cc. Theoretical density for this composition is 6.0 g./cc. The interdispersion consists of about 3.4 parts by volume titanium nitride and about 0.8 part by volume aluminum nitride per part by volume of molybdenum.

This is an excellent tool when used to machine 4340 steel. At a surface speed of 1000 feet per minute, using a 10 mil feed and a 50 mil depth of cut, this tool cuts for 3 minutes without failure, and exhibits a flank wear of only 4 mils and a crater depth of only 1 mil. On 4340 steel at a surface speed of 315 feet per minute, using a 30 mil feed and a ⅛" depth of cut, this tool cuts without failure for 1 minute, exhibiting a flank wear of only 1 mil and no measurable crater depth. This is also a good cutting tool for climb milling on malleable cast iron running 11 inches without failure, showing a flank wear of only 2 mils, when tested at 348 surface feet per minute, depth of cut of 100 mils, and a feed of 30 mils per tooth.

Examples 58–85

In the following examples all powder operations are carried out in an inert atmosphere as in previous examples. The constituents in the form of 10 micron powders are intermixed in the amounts indicated in Table 3 and are ballmilled for 5 days in a 4.8 liter ballmill containing 655 grams of a hydrocarbon oil having a flash point of 85° C., and 13,800 grams of the tungsten carbide-cobalt inserts of Example 3. The constitutents are used in an amount sufficient to yield 75 cubic centimeters of milled powder.

The interdispersed powders are recovered from the mill and dried as in Example 1. 3.2 cubic centimeters of each of the milled powders is then loaded into a 1 inch inner diameter 1¾ inch outer diameter graphite mold, the ends of which are capped with 1 inch by ³⁄₁₆ inch graphite discs.

The powder is packed in the mold by tapping the bottom of the mold for about 1½ minutes after inserting the bottom piston. The top piston is then inserted and the mold assembly is transferred under vacuum into the hot zone of a press held at 1100° C. During the transfer the temperature of the hot zone will drop to about 1000° C. and when the transfer is complete the temperature is raised to the fabrication temperature of Table III over the period of time indicated in Table III.

After holding the sample at fabrication temperature for the amount of time shown in Table III, a pressure of 4000 p.s.i. is applied to the pistons for a period of time as shown, and the dense interdispersion thus formed is then ejected from the hot zone, cooled and removed from the press.

Samples are cut from the dense interdispersion for determining transverse rupture strength and hardness. In the examples where indicated in Table III, additional samples are cut from the dense interdispersion for cutting tool tests. The latter are prepared as rectangles ½ inch by ½ inch by ³⁄₁₆ inch in size with the corners ground to a radius of about ¹⁄₃₂ of an inch.

The cutting tool tests are performed by clamping the rectangular sample in a conventional turning tool holder which is in turn mounted on a lathe. The metal subject is a cylinder of AISI 4340 steel about 4 inches in diameter, having a Brinnell hardness of approximately 350. The tests are run at a speed of 850 surface feet per minute, a depth of cut of .05 inch and a feed of .098 inch. Cutting is carried out for 3 minutes after which the rectangular sample is examined by optical microscope to determine flank wear and crater depth.

3,409,416

TABLE III

| Ex. No. | Composition | | | | | | | | | Fabrication Conditions | | | | | Properties | | |
|---|---|---|---|---|---|---|---|---|---|---|---|---|---|---|---|---|---|
| | Amt. Metal Vol. % | Amt. Refractory Vol. % | Metal | | Refractory Components | | | | | Max. Temp., °C | Heat-Up Time, Min. | Hold Time Before Press., Min. | Hold Time Under Press., Min. | Transverse Rupt. Str. P.s.i. | Hardness Rockwell A | Cutting Tool Test | |
| | | | W Vol. % | Other Vol. % | TiN Vol. % | TaN Vol. % | ZrN Vol. % | AlN Vol. % | Al₂O₃ Vol. % | Others Vol. % | | | | | | | Avg. Flank Wear, Mils | Avg. Crate Depth, Mils |
| 58 | 30 | 70 | 8 | 22 Cr | 50 | | | | | | 1,500 | 13.5 | 4 | 2 | 130,000 | 90.4 | 6 | |
| 59 | 30 | 70 | 30 | | 40 | 30 | | | | | 1,600 | 17.5 | 3 | 3 | 143,000 | 89.2 | | 2.5 |
| 60 | 20 | 80 | 30 | | 50 | | | | | 20 REN¹ | 1,650 | 17.5 | 3 | 3 | 97,000 | 86 | | |
| 61 | 20 | 80 | 20 | 16.6 Cr | 60 | 20 | | | | | 1,600 | 16.5 | 3 | 3 | 137,000 | 90.2 | 6 | 0.5 |
| 62 | 20 | 80 | 34 | | 80 | | | | | | 1,500 | 11.5 | 3 | 3 | 120,000 | | | |
| 63 | 30 | 70 | 30 | | 50 | | | | | | 1,600 | 16 | 3 | 3 | 123,000 | 90.9 | 8 | 0.5 |
| 64 | 30 | 70 | 30 | | 50 | | | 5 | | | 1,600 | 16 | 3 | 3 | 110,000 | 90.4 | 8 | 0.5 |
| 65 | 20 | 80 | 15 | 15 Cr | 50 | | | | 15 | | 1,400 | 9 | 3 | 3 | 106,000 | 91.9 | 6 | 1.0 |
| 66 | 30 | 70 | 6 | 14 Cr | 50 | | | | 20 | | 1,500 | 6.5 | 3 | 3 | 115,000 | 92.8 | | |
| 67 | 30 | 70 | 30 | | 50 | | | | | | 1,600 | 17 | 3 | 3 | 77,000 | 87.8 | 10 | 1.0 |
| 68 | 30 | 70 | 30 | | 50 | | | | | 20 REN¹ | 1,600 | 15 | 3 | 3 | 96,000 | 89 | 8 | 0.5 |
| 69 | 20 | 80 | 30 | | 50 | | | 5 | | 20 MgO | 1,700 | 9.5 | 3 | 3 | 124,000 | | 12 | 0.5 |
| 70 | 20 | 80 | 30 | 17 Cr | | | 80 | | | 15 Y₂O₃ | 1,550 | 14 | 3 | 3 | 107,000 | 87.6 | 8 | 0.5 |
| 71 | 20 | 80 | 3 | 16.5 Cr | | | | 20 | | 20 ZnO | 1,500 | 10.5 | 3 | 3 | 129,000 | | 8 | 0.5 |
| 72 | 20 | 80 | 3.5 | | 60 | | | 5 | | | 1,750 | 11 | 3 | 3 | 84,000 | 91.6 | | |
| 73 | 30 | 70 | 30 | | 50 | | 50 | 5 | | | 1,700 | 11 | 3 | 3 | 142,000 | 87.3 | 12 | 1.0 |
| 74 | 30 | 70 | 30 | | | | | 5 | 15 | 15 TiO₂ | 1,700 | 10 | 3 | 3 | 110,000 | 89.4 | 6 | 1.0 |
| 75 | 10 | 90 | 10 | | 30 | | | 20 | 35 | 15 ZrO₂ | 1,800 | 9.5 | 3 | 3 | 128,000 | 91.1 | 8 | 1.0 |
| 76 | 10 | 90 | 10 | | 50 | | | 5 | 5 | | 1,800 | 15 | 3 | 3 | 105,000 | 91.6 | | |
| 77 | 10 | 90 | 10 | | 70 | | | 5 | 5 | | 1,800 | 15 | 3 | 3 | 127,000 | 92.8 | | |
| 78 | 30 | 70 | 30 | | 80 | | | 5 | | | 1,800 | 15 | 3 | 3 | 175,000 | 90 | | |
| 79 | 30 | 70 | 30 | | 50 | | | 5 | 15 | | 1,600 | 19 | 3 | 3 | 115,000 | 90.5 | | |
| 80 | 30 | 70 | 30 | | 40 | | | 30 | | | 1,800 | 8 | 2 | 3 | 232,000 | 90.8 | | |
| 81 | 30 | 70 | 26 | 4 Mn | 50 | | | 5 | 15 | | 1,800 | 19 | 2 | 4 | 193,000 | 90.5 | | |
| 82 | 30 | 70 | 26 | 4 Ni | 50 | | | 5 | 15 | | 1,600 | 9 | 2 | 4 | 206,000 | 89.8 | | |
| 83 | 30 | 70 | 26 | 4 Co | 50 | | | 5 | 15 | | 1,600 | 19 | 2 | 4 | 178,000 | 91.6 | | |
| 84 | 30 | 70 | 26 | 4 Fe | 50 | | | 5 | 15 | | 1,600 | 19 | 2 | 4 | 123,000 | 90.5 | | |
| 85 | | | | | | | | | | | | | | | 162,000 | | | |

¹ Mixed Rare Earth Nitrides.

I claim:
1. A dense interdispersion consisting essentially of from 1 part to 99 parts by volume of an essential nitride selected from the group consisting of titanium nitride, zirconium nitride, tantalum nitride, hafnium nitride, aluminum nitride, vanadium nitride, niobium nitride and their mixtures, bonded with one part by volume of a binder metal selected from the group consisting of molybdenum, tungsten, rhenium, their alloys with each other and with chromium, and their alloys with a minor amount of a metal selected from the group consisting of aluminum, titanium, zirconuim, hafnium, vanadium, niobium, tantalum, magnese, iron, cobalt and nickel, said interdispersion having a density of at least 98% of its theoretical density.

2. A dense interdispersion of claim 1 in which up to 50% by volume of the essential nitride is replaced by a compound selected from the group consisting of the nitrides of beryllium, thorium, cerium, boron, uranium and the rare earth metals, the silicates, aluminates and chromites of zirconium, magnesium, calcium, barium and strontium, the carbides of titanium, niobium, zirconium and tantalum and the oxides of magnesium, zirconium, aluminum, thorium, hafnium, titanium, chromium, beryllium, zinc, calcium, barium, strontium, silicon, cerium and the rare earth metals, with the limitation that if the compound is selected from the group consisting of alumina and titanium carbide it can be used to replace up to 80% by volume of the essential nitride.

3. A dense interdispersion of claim 1 in which up to 80% by volume of the essential nitride is replaced by a compound selected from the group consisting of alumina and titanium carbide.

4. A dense interdispersion of claim 1 in which up to 50% by volume of the essential nitride is replaced by a compound selected from the group consisting of the nitrides of beryllium, thoruim, cerium, boron, uranium and the rare earth metals, the silicates, aluminates, and chromites of zirconium, magnesium, calcium, barium and strontium, the carbides of titanium, niobium, zirconium and tantalum, and the oxides of magnesium, zirconium, aluminum, thorium, hafnium, titanium, chromium, berryllium, zinc, calcium, barium, strontium, silicon, cerium and the rare earth metals.

5. A dense interdispersion of claim 1 in which the average grain size of the components is less than 10 microns.

6. A dense interdispersion of claim 1 in which the essential nitride and binder metal are both present as continuous three-dimensional networks.

7. A dense interdispersion of claim 1 in which the essential nitride is present in amounts ranging from 1.5 to 19 parts by volume per part by volume of binder metal.

8. A dense interdispersion of claim 7 in which up to 50% by volume of the essential nitride is replaced by a compound selected from the group consisting of the nitrides of beryllium, thorium, carium, boron, uranium and the rare earth metals, the silicates, aluminates and chromites of zirconium, magnesium, calcium, barium and strontium, the carbides of titanium, niobium, zirconium and tantalum and the oxides of magnesium, zirconium, aluminum, thorium, hafnium, titanium, chromium, beryllium, zinc, calcium, barium, strontium, silicon, cerium and the rare earth metals, with the limitation that if the compound is selected from the group consisting of alumina and titanium carbide it can be used to replace up to 80% by volume of the essential nitride.

9. A dense interdispersion of claim 7 in which up to 80% by volume of the essential nitride is replaced by a compound selected from the group consisting of alumina and titanium carbide.

10. A dense interdispersion of claim 7 in which up to 50% by volume of the essential nitride is replaced by a compound selected from the group consisting of the nitrides of beryllium, thorium, cerium, boron, uranium and the rare earth metals, the silicates, aluminates, and chromites of zirconium, magnesium, calcium, barium and strontium, the carbides of titanium, niobium, zirconium and tantalum, and the oxides of magnesium, zirconium, aluminum, thorium, hafnium, titanium, chromium, beryllium, zinc, calcium, barium, strontium, silicon, cerium and the rare earth metals.

11. A dense interdispersion of claim 7 in which the average grain size of the components is less than 10 microns.

12. A dense interdispersion of claim 7 in which the essential nitride and binder metal are both present as continuous three-dimensional networks.

13. A dense interdispersion consisting essentially of from 1.5 to 19 parts by volume of a mixture of titanium nitride and aluminum nitride bonded with one part by volume of a tungsten alloy binder metal.

14. A dense interdispersion of claim 13 in which the average grain size of the components is less than 10 microns.

15. A dense interdispersion of claim 13 in which the nitride and binder metal are both present as continuous three-dimensional networks.

References Cited
UNITED STATES PATENTS

| | | | |
|---|---|---|---|
| 1,631,493 | 6/1927 | Laise | 29—182.5 |
| 1,961,468 | 6/1934 | Walter | 29—182.5 |
| 2,018,752 | 10/1935 | Walter | 29—182.5 |
| 2,180,984 | 11/1939 | Hensel | 29—182.5 |
| 3,011,927 | 12/1961 | Zelezny | 75—205 |
| 3,161,949 | 12/1964 | Dickinson et al. | 29—182.5 |

CARL D. QUARFORTH, *Primary Examiner.*

R. L. GRUDZIECKI, *Assistant Examiner.*